United States Patent [19]

Horvath

[11] 4,107,008
[45] Aug. 15, 1978

[54] ELECTROLYSIS METHOD FOR PRODUCING HYDROGEN AND OXYGEN

[75] Inventor: Stephen Horvath, St. Ives, Australia

[73] Assignee: Beeston Company Limited, Hong Kong, Hong Kong

[21] Appl. No.: 753,610

[22] Filed: Dec. 22, 1976

Related U.S. Application Data

[63] Continuation-in-part of Ser. No. 586,080, Jun. 16, 1975, abandoned, and Ser. No. 632,579, Nov. 17, 1975, said Ser. No. 586,080, is a continuation-in-part of Ser. No. 527,083, Nov. 25, 1974, Pat. No. 3,954,592, said Ser. No. 632,579, is a continuation-in-part of Ser. No. 527,085, Nov. 25, 1974, Pat. No. 3,980,053, said Ser. No. 527,083, and Ser. No. 527,085, each is a continuation-in-part of Ser. No. 485,498, Jul. 3, 1974, abandoned.

[51] Int. Cl.² .................................................. C25B 1/04
[52] U.S. Cl. ..................................................... 204/129
[58] Field of Search .......................................... 204/129

[56] References Cited

U.S. PATENT DOCUMENTS

| 2,016,442 | 10/1935 | Kilgus | 204/129 |
| 3,207,684 | 9/1965 | Dotts | 204/180 R |
| 3,719,583 | 3/1973 | Ustick | 204/180 R |

Primary Examiner—R. L. Andrews
Attorney, Agent, or Firm—Biebel, French & Nauman

[57] ABSTRACT

A novel electrolytic cell produces a mixture of highly ionized hydrogen and oxygen gases by a method combining electrolysis and radiolysis of an aqueous electrolyte. The electrolyte, which may be a 25% of potassium hydroxide, is introduced into the cell and is simultaneously subjected to an electrolysing current and intense irradiation by electromagnetic radiation of frequency less than $10^{-10}$ meters.

14 Claims, 26 Drawing Figures

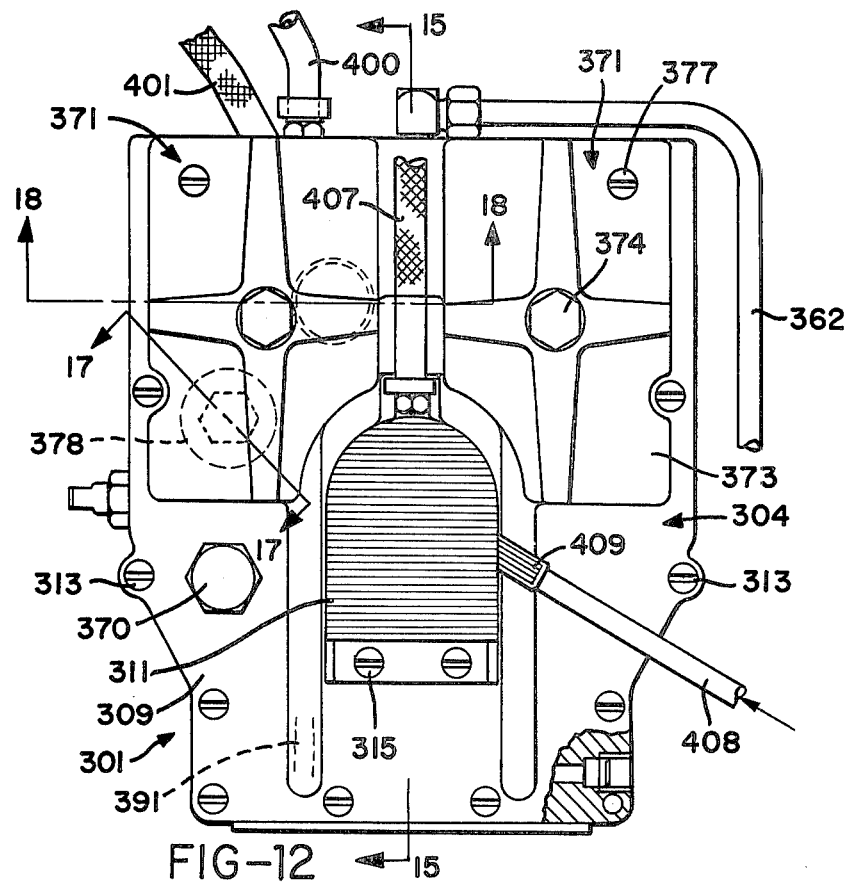
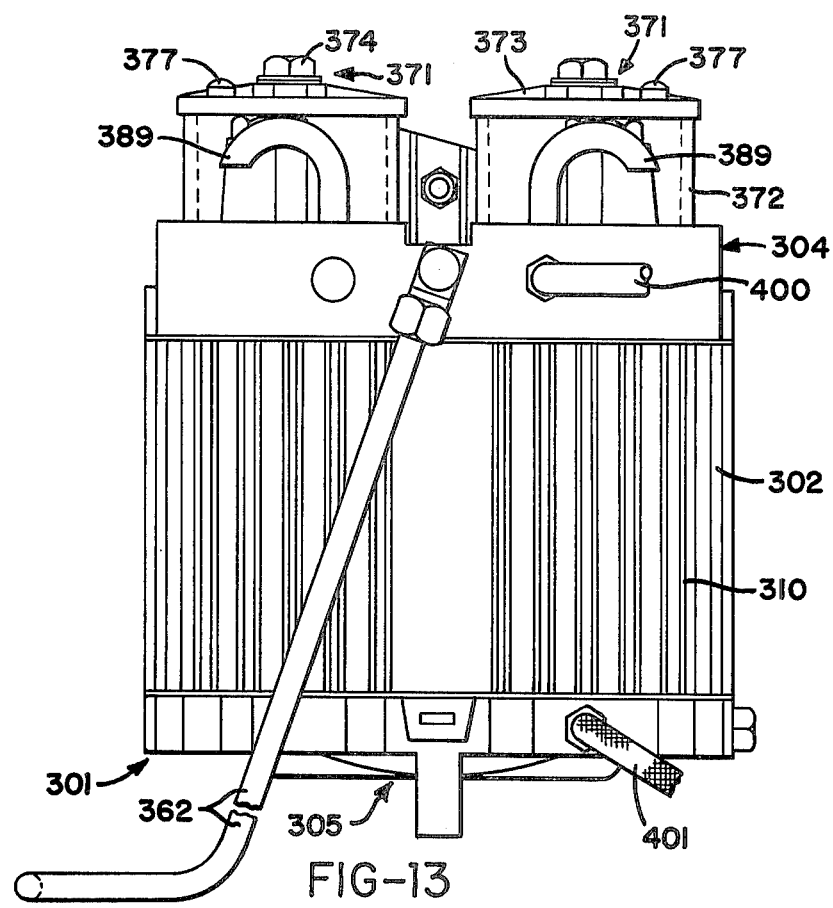

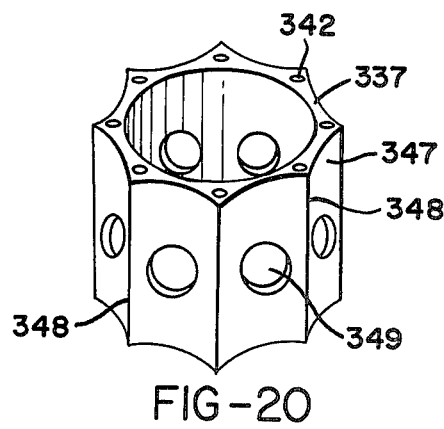
FIG-20
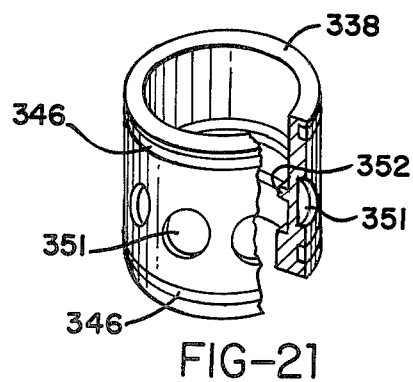
FIG-21
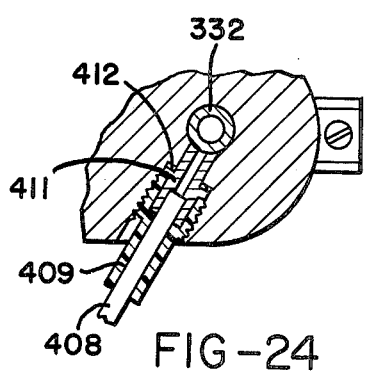
FIG-24
FIG-23
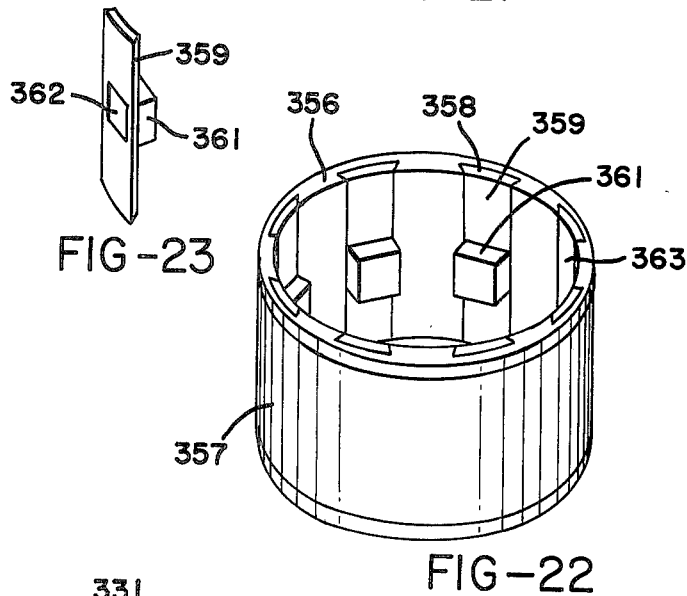
FIG-22
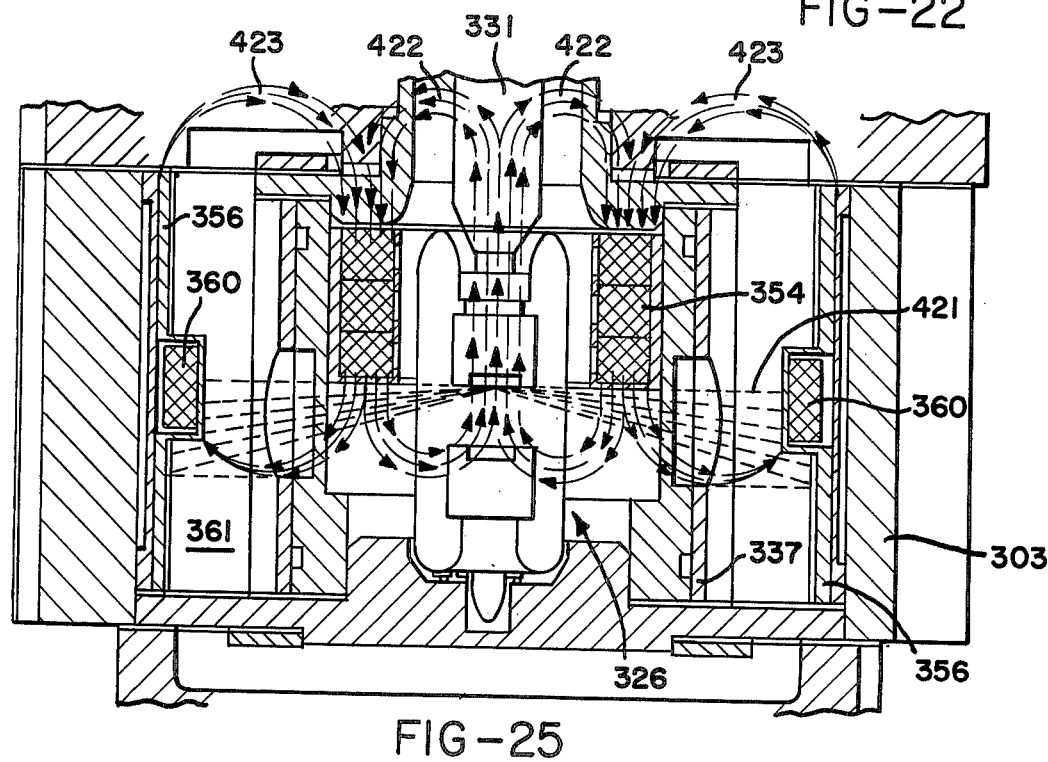
FIG-25

ELECTROLYSIS METHOD FOR PRODUCING HYDROGEN AND OXYGEN

CROSS REFERENCE TO RELATED APPLICATIONS

This application is a continuation-in-part of application Ser. No. 586,080, filed June 16, 1975, (now abandoned) which is a continuation-in-part of Ser. No. 527,083 filed Nov. 25, 1974 (now U.S. Pat. No. 3,954,592), which is a continuation-in-part of Ser. No. 485,498, filed July 3, 1974 and now abandoned. This application is also a continuation-in-part of application Ser. No. 632,579, filed Nov. 17, 1975, which is a continuation-in-part of Ser. No. 527,085, filed Nov. 25, 1974 (now U.S. Pat. No. 3,980,053), which is a continuation-in-part of said Ser. No. 485,498.

BACKGROUND OF THE INVENTION

This invention relates to the general field of electrolysis and has particular, but not exclusive, application to the electrolysis of water to form hydrogen and oxygen.

In an electrolysis process a potential difference is applied between an anode and a cathode in contact with an electrolytic conductor to produce an electric current through the electrolytic conductor.

Many molten salts and hydroxides are electrolytic conductors but usually the conductor is a solution of a substance which dissociates in the solution to form ions. The term "electrolyte" will be used herein to refer to a substance which dissociates into ions, at least to some extent, when dissolved in a suitable solvent. The resulting solution will be referred to as an "electrolyte solution."

In a simple electrolysis porcess the mass of substance liberated at an anode or cathode is, in accordance with Faraday's laws of electrolysis, strictly proportional to the quantity of electricity passed between the anode and cathode. The rate of decomposition of the electrolyte is thus limited and it is generally uneconomical for example, to generate hydrogen and oxygen from water commercially by an electrolysis process.

it is known that compounds, including electrolytes such as water, can be decomposed into their constituent elements by irradiation with short wave electromagnetic radiation. Such radiation induced dissociation or decomposition may be termed "radiolysis". For example, a paper by Dr. Akibumi Danno entitled "Producing Hydrogen with Nuclear Energy" published in the "Chemical Economy and Engineering Review" of June, 1974 describes in some detail the radiolysis of water and a number of hydrocarbons with an explanation of the elementary reactions involved in such radiolysis. Briefly, it is found that irradiation with short wave x-rays or gamma rays, i.e. electromagnetic radiation of wave length less than $10^{-10}$ meters, results in direct decomposition of the compounds concerned. For example, if water is irradiated with gamma radiation the water will be dissociated into hydrogen and oxygen. Danno proposes the use of a nuclear reactor as a source of radiation on a massive scale but concludes that water radiolysis is not a very efficient method of producing hydrogen and he proposes instead a process involving a radiolysis of carbon dioxide to produce carbon monoxide and oxygen and a subsequent conversion of the carbon monoxide to hydrogen gas by the conventional water/gas conversion process.

SUMMARY OF THE INVENTION

The present invention provides for an electrolysis process in which radiolysis is also present. It is found that with the combination of electrolysis and radiolysis the yield of decomposition products can be greater than that achieved by either a simple electrolysis process or simple radiolysis. The yield rate can be very much improved in the combined electrolysis and radiolysis process by providing a magnetic field in the electrolytic conductor which provides preferred paths for the high speed photons of the short wave electromagnetic radiation and also for the ions in the electrolytic conductor thereby increasing the possibility for collision between the electrons and the ions with a subsequent improved radiolysis yield.

In one method according to the invention, pulses of high voltage electrical energy are applied between the anode and cathode of an electrolytic cell in such a manner as to generate the necessary short wave length radiation for radiolysis. In another method according to the invention pulses of high voltage electrical energy are discharged in one or more short wave length radiation generators separate from the anode and cathode but disposed such that the electrolytic conductor within the cell is irradiated by the short wave radiation produced thereby. The high voltage pulses of electrical energy can be generated by a quite modest direct current input supplied and the methods according to the invention will produce a greatly increased yield of decomposition products over that which could be achieved by passing the supply current through the electrolytic conductor.

The invention also provides apparatus adapted to practise the methods of the invention.

As previously mentioned, the invention is particularly applicable to the decomposition of water or aqueous solutions to generate hydrogen and oxygen gases and, in order that the invention may be more fully explained, apparatus designed specifically for such generation of hydrogen and oxygen will now be described in detail with reference to the accompanying drawings.

BRIEF DESCRIPTION OF THE DRAWINGS

In the drawings:

FIG. 12 is a plan view of an electrolytic cell of a further embodiment of the invention;

FIG. 13 is a rear view of the cell illustrated in FIG. 12;

FIG. 20 is a perspective view of an anode component of the cell shown in FIG. 12;

FIG. 21 is a broken perspective view of an anode sleeve component of the cell shown in FIGS. 12;

FIG. 22 is a perspective view of a cathode assembly of the cell shown in FIG. 12;

FIG. 23 is a perspective view of a component of the assembly shown in FIG. 22;

FIG. 24 is a scrap cross-section through an electrical connection incorporated in the cell;

FIG. 25 is a vertical cross-section through the cell illustrating diagrammatically paths of electromagnetic radiation and magnetic fields within the cell.

DESCRIPTION OF THE PREFERRED EMBODIMENTS

Figure 1:
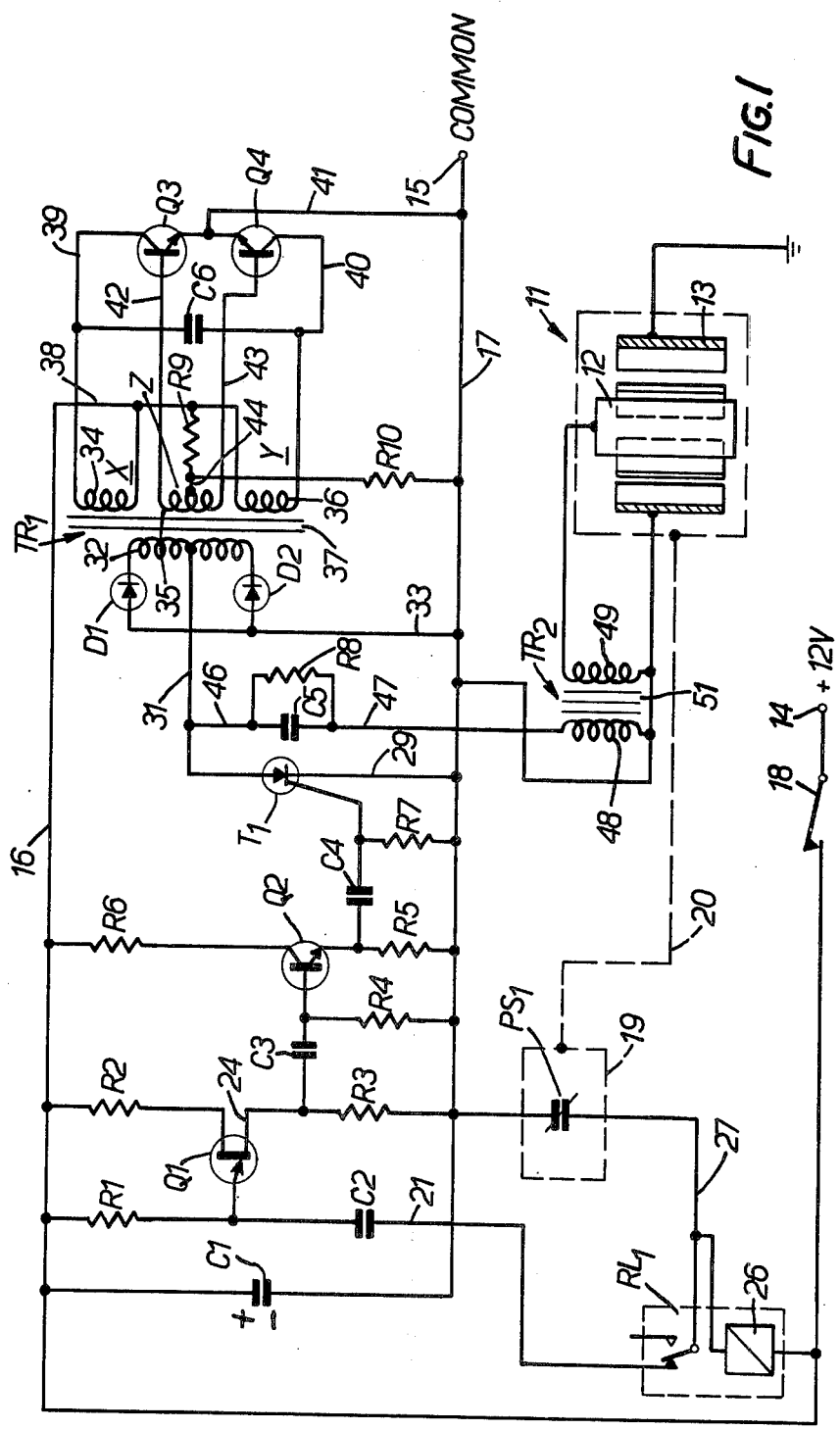
FIG. 1 is a circuit diagram for one apparatus constructed in accordance with the invention.
Figure 2:
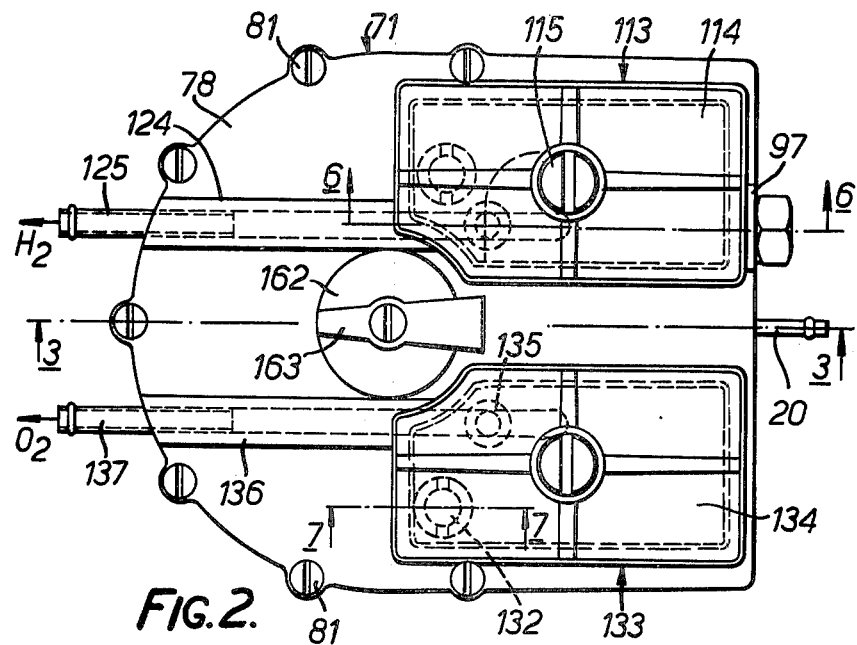
FIG. 2 is a plan view of an electrolytic cell of the apparatus.
Figure 4:
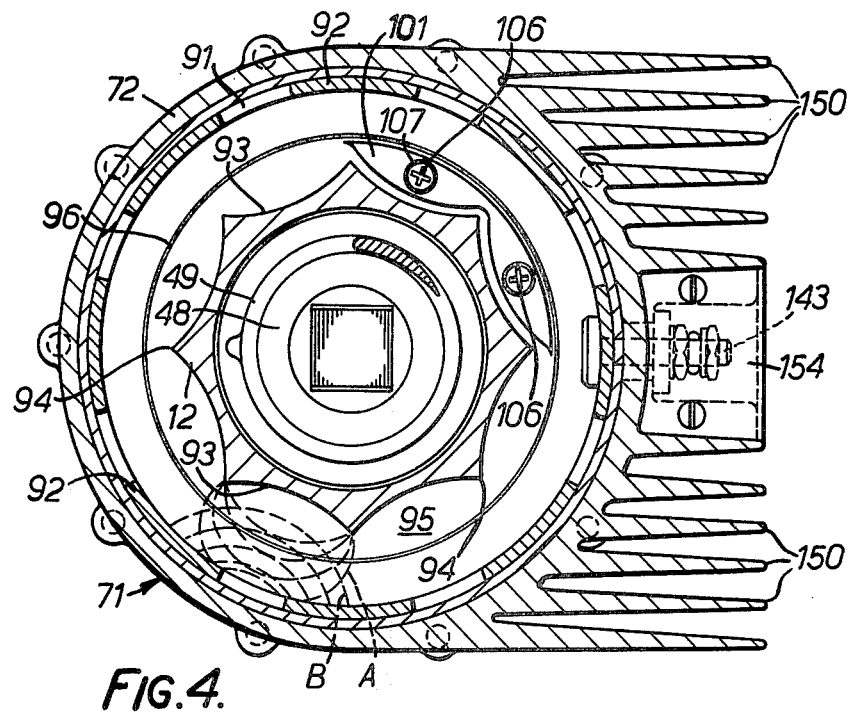
FIG. 4 is a cross-section on the line 4—4 in FIG. 3.

The apparatus illustrated in FIGS. 1 to 7 comprises an electrolytic cell denoted generally as 11 and having an anode 12 and cathode 13. The apparatus has an electric circuit such as to generate high voltage pulses of electrical energy which are applied between the anode 12 and the cathode 13. Specifically, the circuit is such as to develop the required high voltage pulses from a source of direct current electrical energy which may for example be a 12 volt battery, connected between terminals 14, 15. Line 16 from terminal 14 may be considered as receiving the positive input and line 17 from terminal 15 may be considered as a common negative for the circuit. Line 16 includes a simple ON/OFF master control switch 18.

As shown in FIG. 1 the electrical circuit comprises pulse generator circuitry comprising unijunction transistor Q1 with associated resistors R1, R2, R3 and capacitors C2 and C3. This circuity produces pulses which are used to trigger an NPN silicon power transistor Q2 which in turn provides via a capacitor C4 triggering pulses for a thyristor T1.

Resistor R1 and a capacitor C1 are connected in series in a line 21 extending to one of the fixed contacts of a relay RL1. The coil 26 of relay RL1 is connected between line 16 and a line 27 which extends from the moving contact of the relay to the common negative line 17 via a normally closed pressure operated switch 19. The pressure control line 20 of switch 19 is connected in a manner to be described below to a gas collection chamber of electrolytic cell 11 in order to provide a control connection whereby switch 19 is opened when the gas in the collection chamber reaches a certain pressure. However, provided that switch 19 remains closed, relay RL1 will operate when master control switch 18 is closed to provide a connection between lines 21 and 27 thereby to connect capacitor C2 to the common negative line 17. The main purpose of relay RL1 is to provide a slight delay in this connection between the capacitor C2 and the common negative line 7 when the circuit is first energized. This will delay the generation of triggering pulses to thyristor T1 until a required electrical condition has been achieved in the transformer circuitry to be described below. It is preferred that relay RL1 be hermetically sealed and have a balance armature so that it can operate in any position and can withstand substantial shock or vibration.

When the connection between capacitor C2 and line 17 is made via relay RL1, uninjunction transistor Q1 will act as an oscillator to provide positive output pulses in line 24 at a pulse rate which is controlled by the ratio of R1:C1 and at a pulse strength determined by the ratio of R2:R3. These pulses will charge the capacitor C3. Electrolytic capacitor C1 is connected directly between the common positive line 16 and the common negative line 17 to filter the circuitry from all static noise.

Resistor R1 and capacitor C2 are chosen such that at the input to transistor Q1 the pulses will be of saw tooth form. This will control the form of the pulses generated in the subsequent circuitry, and the saw tooth pulse form is chosen since it is believed that it produces the most satisfactory operation of the pulsating circuitry. It should be stressed, however, that other pulse forms, such as square wave pulses, could be used. Capacitor C3, which is charged by the output pulses of transistor Q1, discharges through a resistor R4 to provide triggering signals for transistor Q2. Resistor R4 is connected to the common negative line 17 to serve as a gate current limiting device for transistor Q2.

The triggering signals produced by transistor Q2 via the network of capacitor C3 and resistor R4 will be in the form of positive pulses of sharply spiked form. The collector of transistor Q2 is connected to the positive supply line 16 through resistor R6 while the emitter of that transistor is connected to the common negative line 17 through resistor R5. These resistors R5 and R6 control the strength of current pulses applied to a capacitor C4 which discharges through a resistor R7 to the common negative line 17, thereby to apply triggering signals to the gate of thyristor T1. The gate of thyristor T1 receives a negative bias from the common negative line via resistor R7 which thus serves to prevent triggering of the thyristor by the inrush currents.

The triggering pulses applied to the gate of thyristor T1 will be very sharp spikes occurring at the same frequency as the saw tooth wave form pulses established by unijunction transistor Q1. It is preferred that this frequency be of the order of 10,00 pulses per second and details of specific circuit components which will achieve this result are listed below. Transistor Q2 serves as an interface between unijunction transistor Q1 and thyristor T1, preventing backflow of EMF from the gate of the thyristor, which might otherwise interfere with the operation of transistor Q1. Because of the high voltages being handled by the thyristor and the high back EMF applied to transistor Q2, the latter transistor must be mounted on a heat sink.

The cathode of thyristor T1 is connected via a line 29 to the common negative line 17 and the anode is connected via a line 31 to the centre of the secondary coil 32 of a first stage transformer TR1. The two ends of transformer coil 32 are connected via diodes D1 and D2 and a line 33 to the common negative line 17 to provide full wave rectification of the transformer output.

First stage transformer TR1 has three primary coils 34, 35, 36 wound together with secondary coil 32 about a core 37. This transformer may be of conventional half cup construction with a ferrite core. The secondary coil may be wound on to a coil former disposed about the core and primary coils 34 and 36 may be wound in bifilar fashion over the secondary coil. The other primary coil 35 may then be wound over the coils 34, 36. Primary coils 34 and 36 are connected at one side by a line 38 to the uniform positive potential of circuit line 16 and at their other sides by lines 39, 40 to the collectors of transistors Q3, Q4. The emitters of transistors Q3, Q4 are connected permanently via a line 41 to the common negative line 17. A capacitor C6 is connected between lines 39, 40 to act as a filter preventing any potential difference between the collectors of transistors Q3, Q4.

The two ends of primary coil 35 are connected by lines 42, 43 to the bases of transistors Q3, Q4. This coil is centre tapped by a line 44 connected via resistor R9 to the positive line 16 and via resistor R10 to the common negative line 17.

When power is first applied to the circuit, transistors Q3 and Q4 will be in their non-conducting states and there will be no current in primary coils 34, 36. However, the positive current in line 16 will provide via resistor R9 a triggering signal applied to the centre tap of coil 35, and this signal operates to trigger alternate high frequency oscillation of transistors Q3, Q4, which will result in rapid alternating pulses in primary coils 34,36. The triggering signal applied to the centre tap of coil 35 is controlled by the resistor network provided by resistors R9 and R10 such that its magnitude is not sufficient to enable it to trigger Q3 and Q4 simultaneously but is sufficient to trigger one of those transistors. Therefore only one of the transistors is fired by the initial triggering signal to cause a current to flow through the respective primary coil 34 or 36. The signal required to hold the transistor in the conducting state is much less than that required to trigger it initially, so that when the transistor becomes conductive, some of the signal applied to the centre tap of coil 33 will be diverted to the non-conducting transistor to trigger it. When the second transistor is thus fired to become conductive, current will flow through the other of the primary coils 34,36 and since the emitters of the two transistors are directly connected together, the positive output of the second transistor will cause the first-fired transistor to be shut off. When the current drawn by the collector of the secondfired resistor drops, part of the signal on the centre tap of coil 35 is diverted back to the collector of the first transistor which is re-fired. It will be seen that the cycle will then repeat indefinitely, so that transistors Q3, Q4 are alternately fired and shut off in very rapid sequence. Thus current pulses flow in alternate sequence through primary coils 34, 36 at a very high frequency, this frequency being constant and independent of changes in input voltage to the circuit. The rapidly alternating pulses in primary coils 34 and 36, which will continue for so long as master control switch 18 remains closed, will generate higher voltage signals at the same frequency in the transformer secondary coil 32.

A dump capacitor C5 bridged by a resistor R8 is connected by a line 46 to the line 31 from the secondary coil of transformer TR1 and provides the output from that transformer which is fed via line 47 to a second stage transformer TR2.

When thyristor T1 is triggered to become conductive the full charge of dump capacitor C5 is released to second stage transformer TR2. At the same time the first stage of transformer TR1 ceases to function because of this momentary short circuit placed across it and consequently thyristor T1 releases, i.e. becomes non-conductive. This permits charge to be built up again in dump capacitor C5 for release when the thyristor is next triggered by a signal from transistor Q2. Thus during each of the intervals when the thyristor is in its non-conducting state the rapidly alternating pulses in primary coils 34, 36 of transformer TR1 produced by the continuously oscillating transistors Q3, Q4 produce, via the transformer coupling, relatively high voltage output pulses which build up a high charge in capacitor C5 and this charge is released suddenly when the thyristor is triggered. In a typical apparatus using the 12 volt DC supply at terminals 14,15 pulses of the order of 22 amps at 300 volts may be produced in line 47.

As previously mentioned relay RL1 is provided in the circuit to provide a delay in the connection of capacitor C2 to the common negative line 17. This delay, although very short, is sufficient to enable transistors Q3, Q4 to start oscillating to cause transformer TR1 to build up a charge in dumping capacitor C5 before the first triggering signal is applied to thyristor T1 to cause discharge of the capacitor.

The circuit includes a second stage transformer TR2. This is step-up transformer comprising a primary coil 48 and a secondary coil 49 wound about a common core 51 and it produces pulses of very high voltage in the secondary coil 49 which pulses are applied between anode 12 and cathode 13. As shown in FIG. 1, the secondary coil 49 is connected not only between the anode and the cathode but also back to the negative side of primary coil 48. The second stage transformer is built into the anode of the electrolytic cell 11. Its physical construction and the manner in which its electrical connections are made will be explained in detail below.

In a typical apparatus the output from the first stage transformer TR1 would be 300 volt pulses of the order of 22 amps at 10,000 pulses per second at a duty cycle of slightly les than 0.1. This can be achieved from a uniform 12 volt and 40 amps DC supply applied between terminals 14,15 using the following circuit components:

R1 2.7 K ohms ½ watt 2% resistor
R2 220 ohms ½ watt 2% resistor
R3 100 ohms ½ watt 2% resistor
R4 22 K ohms ½ watt 2% resistor
R5 100 ohms ½ watt 2% resistor
R6 200 ohms ½ watt 2% resistor
R7 1 K ohms ½ watt 2% resistor
R8 10 M ohms 1 watt 5% resistor
R9 100 ohms 5 watt 10% resistor
R10 5.6 ohms 1 watt 5% resistor
C1 2200 MF 16V electrolytic capacitor
C2 0.10 MF 100V 10% capacitor
C3 2.2 MF 100V 10% capacitor
C4 1 MF 100V 10% capacitor
C5 1 MF 1000V Ducon paper capacitor 5 S10A
C6 0.022 MF 160V capacitor
Q1 - 2N 2647 PN unijunction transistor
Q2 2N 3055 NPN silicon power transistor
Q3 2N 3055 NPN silicon power transistor
Q4 2N 3055 NPN silicon power transistor
T1 BTW 30 800RM fast turn-off thyristor
D1 A 14 P diode
D2 A 14 P diode
RL1 PW5LS hermetically sealed relay
PS1 P658A-10051 pressure switch
TR1 Half-cup transformer cores 36/22-341
 Coil former 4322-021-30390 wound to provide a turns ratio between secondary and primary of 18:1
 Secondary coil 32 = 380 turns Primary coil 34 = 9 turns
Primary coil 36 = 9 turns
Primary coil 35 = 4 turns Transistors Q2, Q3 and Q4 each need to be mounted on a heat sink and a suitable heat sink for this purpose is 35D 3CB. The other circuit components may be installed in a steel container and the heat sink mounted transistors fitted to an exterior surface of the steel container. Alternatively it would be possible to mount at least transistor Q2 within the box if an appropriate heat sink with extended surface area is provided within the box.

The physical construction of electrolytic cell 11 and the second stage transformer TR2 is illustrated in FIGS. 2 to 7. The cell comprises an outer casing 71 having a tubular peripheral wall 72 and top and bottom closures 73, 74. Botton closure 74 is comprised of a domed cover 75 and an electrically insulating disc 76 which are held to the bottom of peripheral wall 72 by circumferentially spaced clamping studs 77. Top closure 73 is comprised of a pair of top plates 78,79 disposed face-to-face and held by circumferentially spaced clamping studs 81 screwed into tapped holes in the upper end of peripheral wall 72.

The anode 12 of the cell is of generally tubular formation. It is disposed vertically within the outer casing and is clamped between upper and lower insulators 82, 83. Upper insulator 82 has a central boss portion 84 and an annular peripheral flange portion 85, the outer rim of which is clamped between upper closure plate 79 and the upper end of peripheral wall 72. Lower insulator 83 has a central boss portion 86, an annular flange portion 87 surrounding the boss portion and an outer tubular portion 88 standing up from the outer margin of flange portion 87. Insulators 82,83 are moulded from an electrically insulating material which is also alkali resistant. Polytetrafluoroethylene is one suitable material.

When held together by the upper and lower closures, insulators 82,83 form an enclosure within which anode 12 and the second stage transformers TR2 are disposed. Anode 12 is of generally tubular formation and it is simply clamped between insulators 82, 83 with its cylindrical inner periphery located on the boss portions 84, 86 of those insulators. It forms a transformer chamber which is closed by the boss portions of the two insulators and which is filled with a suitable transformer oil. An O-ring seal 90 is fitted between insulator boss 86 and the anode to prevent loss of oil from the transformer chamber.

The transformer core 51 is formed as a laminated mild steel bar of approximately ¾ inch square section. It extends vertically between the insulator boss portions 84,86 and its ends are located within recesses in those boss portions. The secondary transformer winding 49 is wound directly onto core 59 whereas the primary winding 48 is wound on a tubular former 89 so as to be spaced outwardly from the secondary winding within the oil filled transformer chamber.

The cathode 13 is in the form of a logitudinally slotted tube which is a close fit within the outer tubular portion 88 of insulator 83. It has eight equally spaced longitudinal slots 91, so that it is essentially comprised of eight cathode strips 92 disposed between the slots and connected together at top and bottom only.

Both the anode and cathode are made of solid nickel. The outer periphery of the anode is machined to form eight circumferentially spaced flutes 93 which have arcuate roots meeting at sharp crests or ridges 94 defined between the flutes. The eight anode crests 94 are radially aligned centrally of the cathode strips 92, and the perimeter of the anode measured along its external surface is equal to the combined widths of the cathode strips measured at the internal surfaces of these strips, so that over the major part of their lengths the anode and cathode have equal effective areas. This equalisation of areas generally has not been available in prior art cylindrical anode/cathode arrangements.

The annular space 95 between the anode and cathode serves as the electrolyte solution chamber. This chamber is divided by a tubular membrane 96 made of nickel film of no more than 0.015 inch thickness perforated by holes of no more than 0.004 inch diameter of 5000 perforations per square inch. This perforated membrane serves as a barrier against mixing of hydrogen and oxygen generated at the cathode and anode respectively while permitting the electrolytic flow of current between the electrodes. Its ends fit into annular slots in the peripheral flanges of upper and lower insulators 82,83 whereby it is electrically isolated from all other components of the cell. This barrier may alternatively be formed by a tightly stretched web of nylon mesh material of sufficiently small mesh size, i.e. such that the mesh openings will not pass bubbles of greater than 0.004 inch diameter. The mesh material may be stretched between end rings of a plastic holder fitted between the annular slots in insulators 82,83.

Initially chamber 95 is filled approximately 75% full with an electrolyte solution of 25% potassium hydroxide in distilled water. Thereafter, as the reaction progresses, the water is depleted and is made up with fresh water admitted into the outer section of chamber 95 via an inlet nozzle 97 formed in upper closure plate 78. The electrolyte solution passes from the outer to the inner section of chamber 95 via the holes in membrane 96. It will be noted however, that membrane 96 is perforated only below the level of the electrolyte solution so that there may be no mixing of hydrogen and oxygen within the cell. The holes, while large enough to allow passage of electrolyte solution therethrough are small enough to prevent passage of bubbles of hydrogen and oxygen normally occurring in the reaction. In the case where the gas barrier is formed by nylon mesh the upper ring of the holder would be formed to provide a solid barrier above the level of the electrolyte solution.

Nozzle 97 has a flow passage 98 extending to an electrolyte inlet valve 99 controlled by a float 101 in chamber 95. Valve 99 comprises a bushing 102 mounted within an opening extending downwardly through upper closure plate 78 and the peripheral flange 85 of upper insulator 82 and providing a valve seat which cooperates with valve needle 103. Needle 103 is lightly biased upwardly by a spring 104 within valve bushing 102. However, the pressure of electrolyte solution within nozzle 97 is sufficient to push the needle downwardly against this spring to allow admission of electrolyte solution to chamber 95 until float 101 lifts the needle hard against the valve seat. The float slides vertically on a pair of star-section slide rods 106 extending between the upper and lower insulators 82 and 83 and also formed of polytetrafluoroethylene. These rods extend through appropriate holes 107 through the float.

The depth of float 101 is chosen such that the electrolyte solution fills only approximately 75% of the chamber 95, leaving the upper part of the chamber as a gas space which can accommodate expansion of the generated gas due to heating within the cell.

As electrolysis of the electrolyte solution within chamber 95 proceeds, hydrogen gas is produced at the cathode, and oxygen gas is produced at the anode. These gases bubble upwardly into the upper part of chamber 95 where they remain separated in the inner and outer compartments defined by membrane 96, and it should be noted that the electrolyte solution enters that part of the chamber which is filled with oxygen rather than hydrogen so there is no chance of leakage of hydrogen back throgh electrolyte inlet nozzle 97.

The abutting faces of upper closure plates 78,79 have matching annular grooves forming within the upper closure inner and outer gas collection passages 108,109. Outer passage 108 is circular, and it communicates with the hydrogen compartment of chamber 95 via eight ports 111 extending downwardly through top closure plate 79 and the peripheral flange of upper insulator 82 adjacent the cathode strips 92. Hydrogen gas flows upwardly through ports 111 into passage 108 and thence upwardly through a one-way valve 112 (FIG. 7) into a reservoir 113 provided by a plastic housing 114 bolted to top closure plate 79 by a centre stud 115 and sealed by a gasket 116. The lower part of housing 114 is charged with water 117, and the hydrogen passes inwardly into reservoir 113 via a tube 118. Valve 112 comprises a bushing 119 providing a valve seat for valve stem 121 which is biased downwardly by a spring 122 and also by the weight of water acting on it.

Hydrogen is withdrawn from reservoir 113 via a crooked tube 123 which connects with an outlet passage 124 in top closure plate 78. Outlet passage 124 terminates in a hydrogen delivery nozzle 125 which may deliver the hydrogen either to storage or directly to the point of consumption.

Oxygen is withdrawn from chamber 95 via the inner annular passage 109 in the top closure. Passage 109 is not circular but has a scalloped configuration to extend around the electrolyte inlet. Oxygen enters it through seven ports 131 extended through top closure plate 79 and the annular flange portion of upper insulator 82. The oxygen flows upwardly from passage 109 through a one-way valve 132 and into a reservoir provided by a plastic housing 134. The arrangement is similar to that for withdrawal of hydrogen and will not be described in great detail. Suffice to say that the bottom of the chamber is charged with water and the oxygen is withdrawn through a crooked tube 135 and an outlet passage 136 in top closure plate 78 terminating in an oxygen delivery nozzle 137.

The pressure sensing tube 20 of control switch 19 is connected directly to the upper part of chamber 95 via passage 138 in top closure plate 79 and upper insulator 82 to sense the hydrogen pressure within the upper part of this chamber. If this pressure rises above a predetermined level switch 19 operates to disconnect capacitor C2 from the common negative line 17. This removes the negative signal from capacitor C2 which is necessary to maintain continuous operation of the pulse generating circuitry for generating the triggering pulses on thyristor T1 and these triggering pulses therefore cease. The transformer TR1 continues to remain in operation to charge dumping capacitor C5, but because thyristor T1 cannot be triggered, dumping capacitor C5 will simply remain charged until the hydrogen pressure in chamber 95 falls below the predetermined level and triggering pulses are applied once more to thyristor T1. Pressure switch 19 thus controls the rate of gas production according to the rate at which it is withdrawn. It is thus possible for example, to feed the hydrogen and oxygen gases directly to an internal combustion engine without intermediate storage, and the apparatus will produce the gases according to demand. The stiffness of the control springs for gas escape valves 112,132 must of course be chosen to allow escape of the hydrogen and oxygen in the proportions in which they are produced by electrolysis, i.e. in the ratios 2:1 by volume.

Reservoirs 113,133 are provided as a safety precaution. If a sudden back-pressure were developed in the delivery pipes this could only shatter the plastic housings 114,134 and could not be transmitted back into the electrolytic cell. Switch 19 would then operate to stop further generation of gases within the cell.

Figure 3:
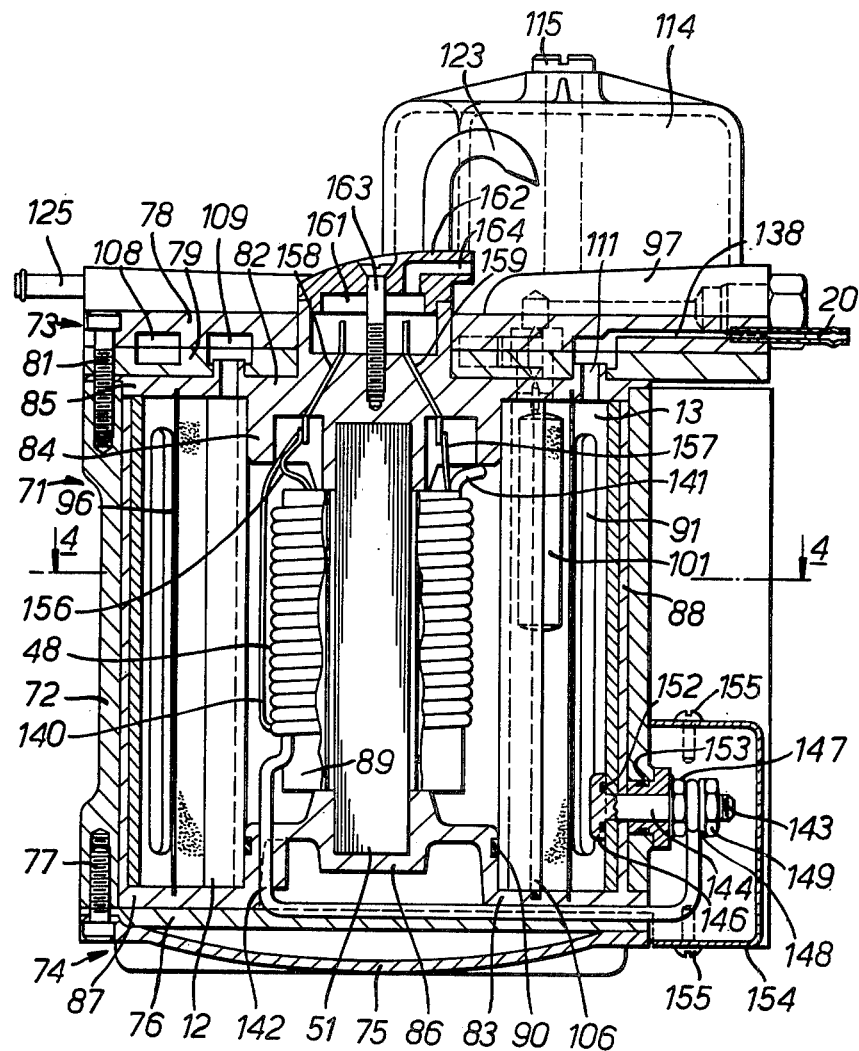
FIG. 3 is a cross-section on the line 3—3 in FIG. 2.

The electrical connections of secondary transformer TR2 are shown in FIG. 3. The two ends of the primary transformer coil 48 are connected by wires 156,157 to conductors 158,159 which extend upwardly through the central boss portion of upper insulator 83. The upper ends of conductors 158,159 project upwardly as pins within a socket 61 formed in the top of upper insulator 83. The top of socket 161 is closed by a cover 162 which is held by a centre stud 163 and has a passage 164 through which wires from the external circuit may be extended and connected to conductors 158,159 by any suitable connector (not shown) located within socket 161.

The ends of secondary coil 49 are connected between the anode and the cathode and an additional connection is made to the conductor 158 connected to the negative side of the primary coil. Specifically, one end of coil 49 is connected to the anode by a wire 141, this connection being entirely within the anode. The other end of coil 49 is connected to the cathode via a wire 142 which extends downwardly through a hole in the bottom insulator 83 and then horizontally to leave casing 71 between bottom insulating disc 76 and insulator 83. The upper face of disc 76 and the lower face of insulator 83 are grooved to receive and clamp onto wire 142. Outside the casing, wire 142 is connected to a cathode terminal bolt 143. Terminal bolt 143 has a stem 144 extending through an opening in the cathode and an insulating bush 144 fitted in an aligned opening in the casing wall 72. The head 146 of the thermal bolt is drawn against the inner periphery of the cathode by tightening of a clamping nut 147, and the end of wire 142 has an eye which is clamped between nut 147 and a washer 148 by tightening a terminal end nut 149. A washer 151 is provided between nut 147 and bush 144, and sealing O-rings 152,153 are provided between bolt head 146 and the cathode and between bush 144 and casing wall 72 to prevent escape of electrolyte solution. The terminal connection is covered by a housing 154 held in place by fixing screws 155.

The additional electrical connection between coil 49 and conductor 158 is made by a wire 150 connected between the wire 142 and the wire 156.

Assuming an input to secondary transformer TR2 of 22 amps at 300 volts and a coil ratio of 100:1 the output voltage applied between the anode and cathode would then be 30,000 volts at a pulse rate of 10,000 pulses per second, with a current flow of 220 milliamps.

This output produces a discharge between the anode and the electrolyte which results in the production of short wave length electromagnetic radiation and also a pulsating current within the electrolyte. Within the space between the anode and the cathode there is a pulsating magnetic field due to the secondary coil of the transformer and this assists in the generation of the short wave length radiation. Specifically, radiation of wave length $10^{-10}$ meters to $10^{-13}$ meters is produced and this radiation produces radiolysis of the electrolyte while the electrolytic flow of current provides for release of the decomposition products of hydrolysis.

The configuration of the anode and the cathode and the arrangement of the secondary transformer within the central anode is of great importance. The anode and cathode, being constructed of magnetic material, are acted on by the magnetic field of the transformer TR2 to become, during the period of energization of that transformer, strong conductors of magnetic flux to create a strong magnetic field in the inter-electrode space between the anode and the cathode. Moreover, the fluted external periphery of the anode and the strip formation of the cathode, shapes this magnetic field such that field lines from the anode are caused to intersect field lines from the cathode as indicated by the respective sets of dotted lines A and B drawn in one portion of the electrolyte chamber in FIG. 4. The high speed photons of the short wave electro-magnetic radiation will tend to follow these field lines. Moreover, the hydrogen and oxygen ions in the electrolyte will be concentrated along these field lines and will, in fact, move along them. Thus, the statistical possibility of collision between the high speed photons of the short wave length radiation and the ions in the electrolyte is very much improved by the generation of this particular magnetic field. Moreover, there is a greatly increased possibility of collision between the ions themselves since these will tend to collide at the intersections of the field lines A and B with subsequent improved liberation of hydrogen and oxygen gases. Thus, the configuration of the anode and cathode which produces intersecting magnetic field lines is extremely important in improving the efficiency of the radiolysis process and also in liberating the decomposition products of hydrogen and oxygen. This particular configuration also causes the surface area of the anode to be extended and permits an arrangement in which the anode and cathode have equal surface areas which is most desirable in order to minimize electrical losses. It is also desirable that the anode and cathode surfaces at which gas is produced be roughened, for example, by sand blasting or knurling. This promotes separation of the gas bubbles from the electrode surfaces and avoids the possibility of overvoltages. The anode and cathode may both be made of nickel but this is not essential, and they might alternatively be formed of nickel plated steel, or they could be made of platinum or be platinum plated.

The heat generated by transformer TR2 is conducted via the anode to the electrolyte solution and also increases the mobility of the ions within the electrolyte solution and thus also contributes to the progress of electrolysis and radiolysis. If desired for dissipation of heat there may be provided cooling fins such as fins 150. The location of the transformer within the anode also enables the connections of the second coil 49 to the anode and cathode to be made of short, well protected conductors.

Dumping capacitor C5 will determine a ratio of charging time to discharge time which will be largely independent of the pulse rate. The pulse rate determined by the unijunction transistor Q1 must be chosen so that the discharge time is not so long as to produce overheating of the transformer coils and more particularly the secondary coil 49 of transformer TR2. With the saw tooth wave input and sharply spiked output pulses of the preferred oscillator circuit the duty cycle of the pulses produced at a frequency of 10,000 pulses per second was about 0.006. This pulse form helps to minimise overheating problems in the components of the oscillator circuit at the high pulse rates involved. A duty cycle of up to about 0.1, as may result from a square wave input, would be feasible but at a pulse rate of 10,000 pulses per second, some of the components of the oscillator circuit would then be required to withstand unusually high heat inputs. A duty cycle of about 0.005 would be a minimum which could be obtained with the illustrated type of oscillator circuitry.

The illustrated electrolytic cell 11 is designed to produce hydrogen and oxygen at a rate sufficient for operation of internal combustion engines and other uses known in the art. Typically, it may have a diameter of about 8 inches and a height of about 8 inches, so that it will be seen to be extremely compact.

Figure 10:
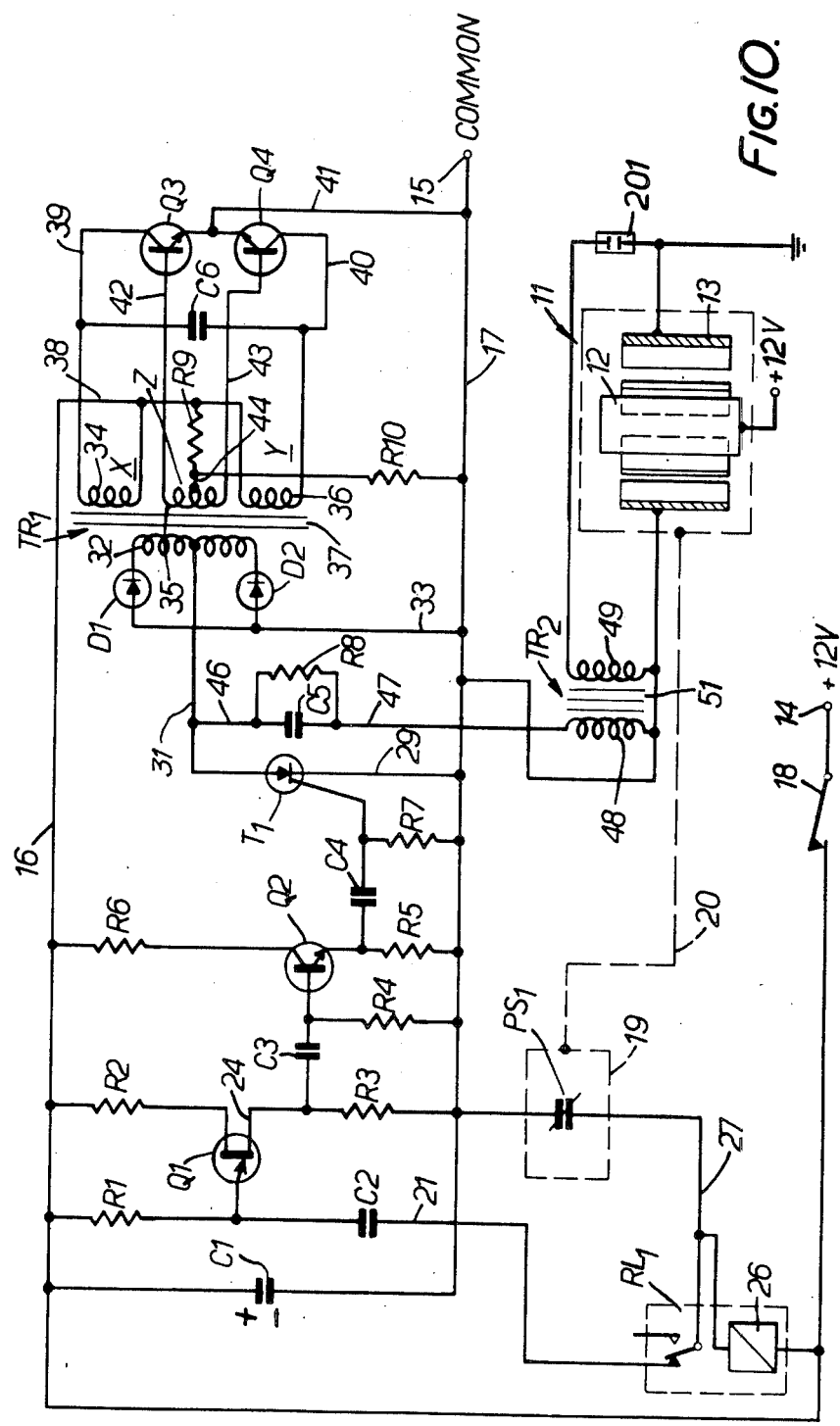
FIG. 10 is a circuit diagram for the modified apparatus of FIGS. 8 and 9.
Figure 5:
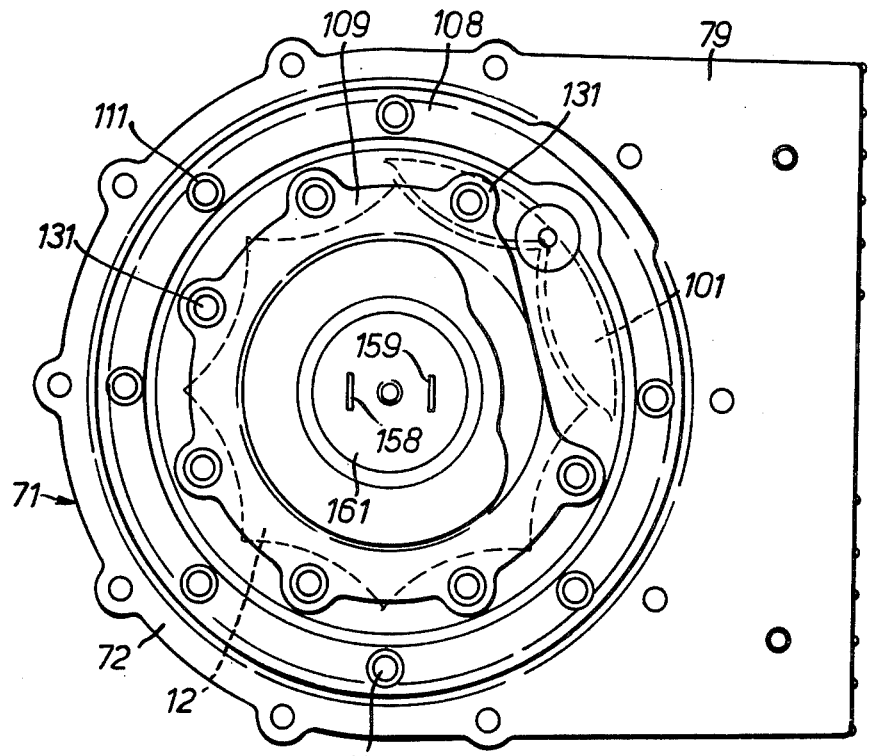
FIG. 5 is a plan view of the electrolytic cell with certain upper parts removed.
Figure 6:
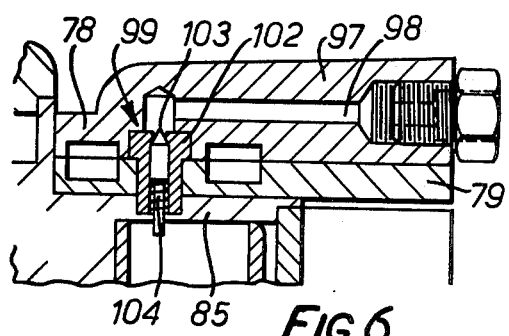
FIG. 6 is a cross-section on the line 6—6 in FIG. 2.
Figure 7:
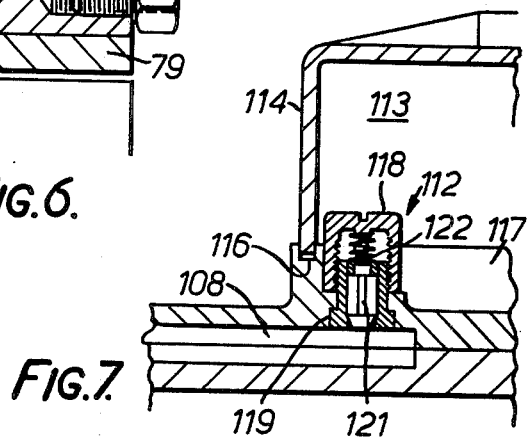
FIG. 7 is a cross-section on the line 7—7 in FIG. 2.
Figure 8:
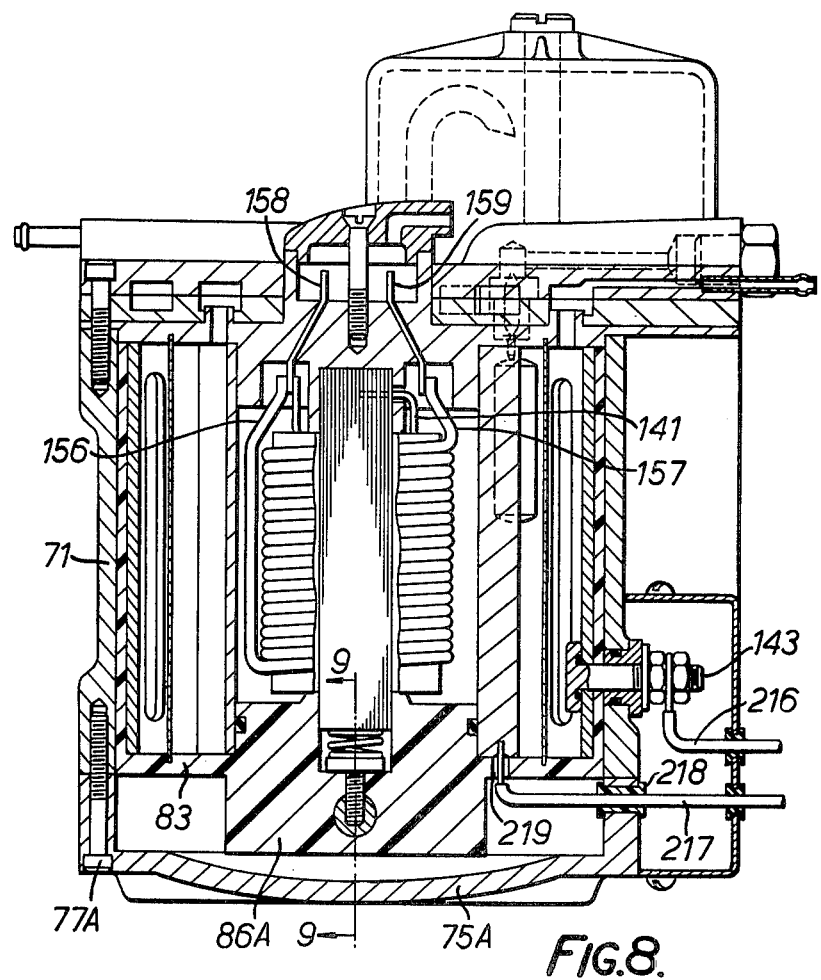
FIG. 8 is a vertical cross-section through a modified form of electrolytic cell.
Figure 9:
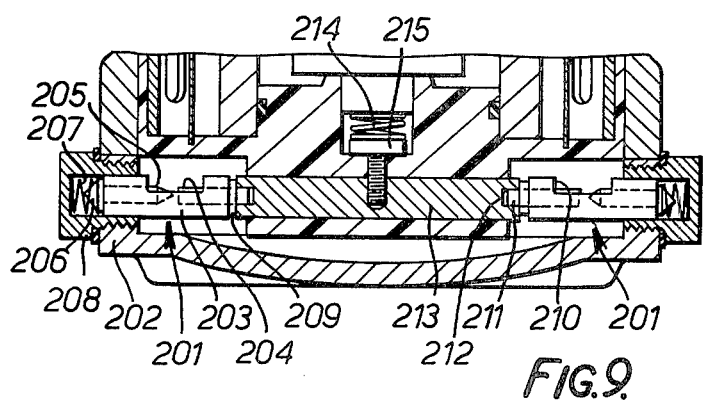
FIG. 9 is a cross-section on the line 9—9 in FIG. 8.

A modified apparatus constructed in accordance with the invention is illustrated in FIGS. 8 to 10. this apparatus is largely the same as that already described with reference to FIGS. 1 to 7 and common components have been identified by the same reference numerals. In this case however the output of the secondary transformer TR2 is not applied directly between the anode 12 and the cathode 13, but is instead applied to radiation generators denoted generally as 201 mounted in the lower part of the electrolytic cell and in addition a constant DC potential, for example 12 volts, is applied between the anode and cathode as indicated in FIG. 10. Modifications made to the bottom part of the electrolytic cell involve a thickening of the central boss portion of lower insulator 83. The thickened boss portion is indicated at 86A. The insulating disc 76 of the previous apparatus is eliminated and the lower domed cover as modified and is indicated in FIGS. 8 and 9 as 75A. The modification of cover 75A includes the provision of a peripheral upstanding sill 202 and the cover is fastened to the bottom of outer casing 71 by long clamping studs 77A extending through vertical holes in the sill 202.

Radiation generators 201 are disposed directly beneath the annular electrolyte chamber at diametrically opposite sides of the chamber. They are of identical construction, each comprising a cylindrical ceramic holder 203 which has a central bore to receive tungsten rod electrodes 204,205. These electrodes are disposed with a gap between them and the holder has an upper notch 210 which exposes the electrode gap. The outer end of electrode 205 has a domed head 206 and a spring 207 is compressed between head 206 and the outer end of a hollow stud 208 which screws into a tapped opening extended radially through sill 202 of cover 75A. The inner end of electrode 205 is sharply pointed and the pointed tip is spaced apart from the adjacent flat end of electrode 204 by a gap of at least 0.006 inches and preferably about 0.016 inches. Electrode 204 is shaped as a simple cylindrical tungsten rod fitted with a brass inner end cap 209 which has a tongue 211 engaging a slot 212 in the end of a brass rod 213 mounted in a hole bored diametrically through the thickened boss 86A of insulator 83.

The output of secondary transformer coil 49 is applied to brass rod 213 via the transformer core 51, a spring 214 and a stud 215 which extends downwardly into boss 86A and into a tapped hole in the centre of rod 213. As indicated in FIG. 8 wire 141 is in this case inserted into the core 51 rather than being connected to the anode as in the previous apparatus and the wire 142 of the previous apparatus is eliminated so there is no connection between the secondary coil and the cathode. Instead a constant 12 volt DC supply is connected directly between the anode and cathode by insulated wires 216, 217. Wire 216 is connected to terminal bolt 143 in place of the wire 142 and wire 217 is extended through a nylon bush 218 in sill 202 of the bottom cover 75A and then upwardly through a hole 219 in insulator 83 and into the lower end of the cathode.

Application of the 30,000 volt pulses to brass rod 213 results in one of the radiation generators 201 acting to generate high intensity gamma radiation which irradiates the electrolyte between the anode and the cathode. The high voltage energy will discharge through that radiation generator which presents the least electrical resistance so that only one generator will operate at any one time. If however one of the generators should fail, the other would start to operate. The rapid pulses of potential difference applied between the electrodes, 204, 205 results in gamma ray radiation because of the impossibility of establishing a current flow between the electrodes sufficient to transmit the high speed electrons involved. The pointed end of electrode 205 increases the resistance to the passage of electrons and therefore enhances the production of gamma radiation of wave length shorter than $10^{-10}$ meters and generally in the range $10^{-10}$ meters to $10^{-13}$ meters.

The strong magnetic field induced by the secondary coil of transformer TR2 also assists in the generation of gamma radiation and in fact enables generation of relatively high intensity radiation by an open air spark discharge. Even further improvement could be achieved if the electrodes 204, 205 were encapsulated in an evacuated tube.

As in the case of the previous embodiment the intersecting magnetic field lines from the anode and cathode provide preferred paths for the high speed photons of the gamma radiation and the ions within the electrolyte will also move along these field lines so that the probability of collisions between ions and high speed photons within the electrolyte is greatly increased and there is also an increased probability of collision of ions at the intersections of the field lines. Thus there is a high rate of decomposition by radiolysis and liberation of decomposition produced by electrolysis.

Figure 11:
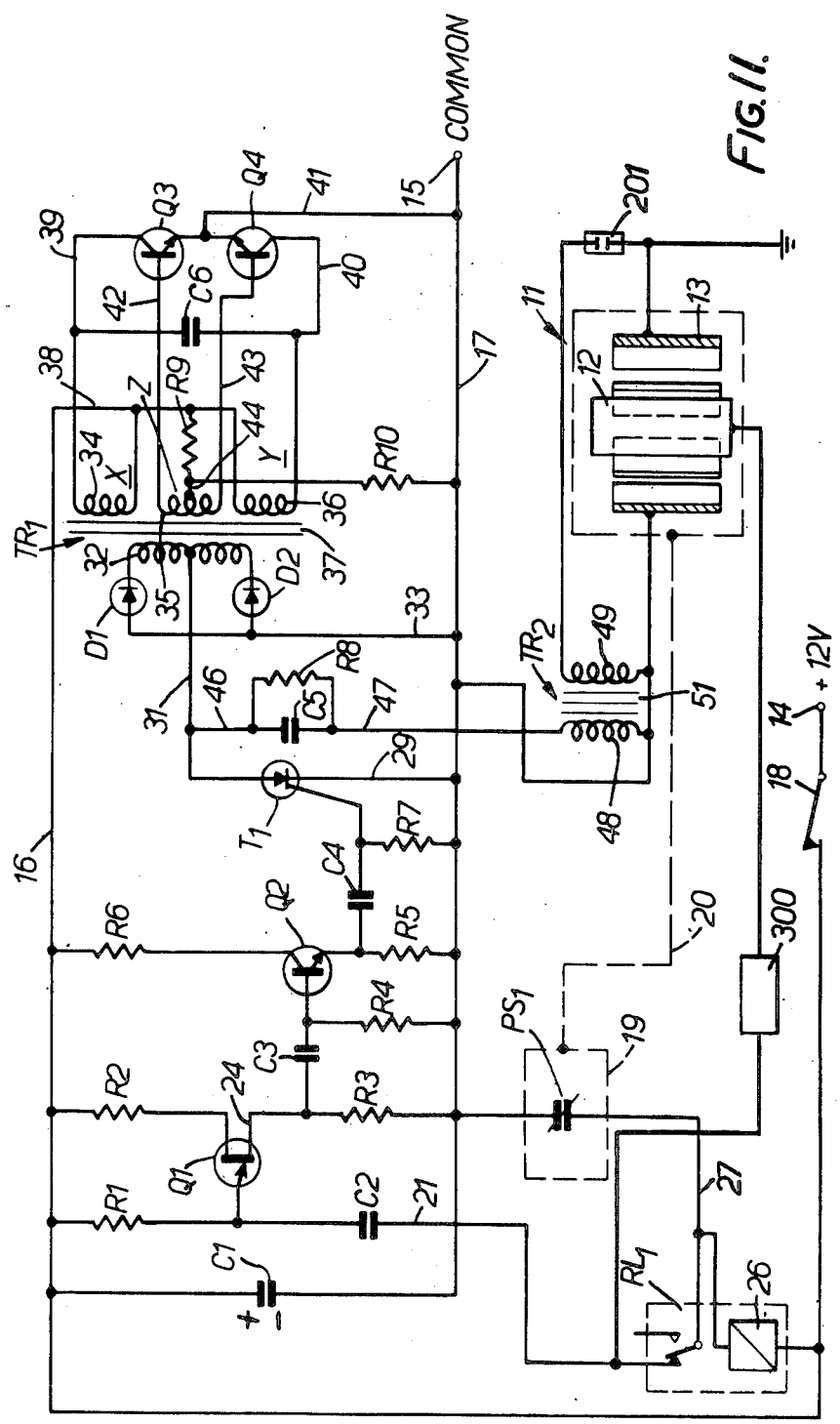
FIG. 11 is a circuit diagram for a further modified apparatus.
Figure 14:
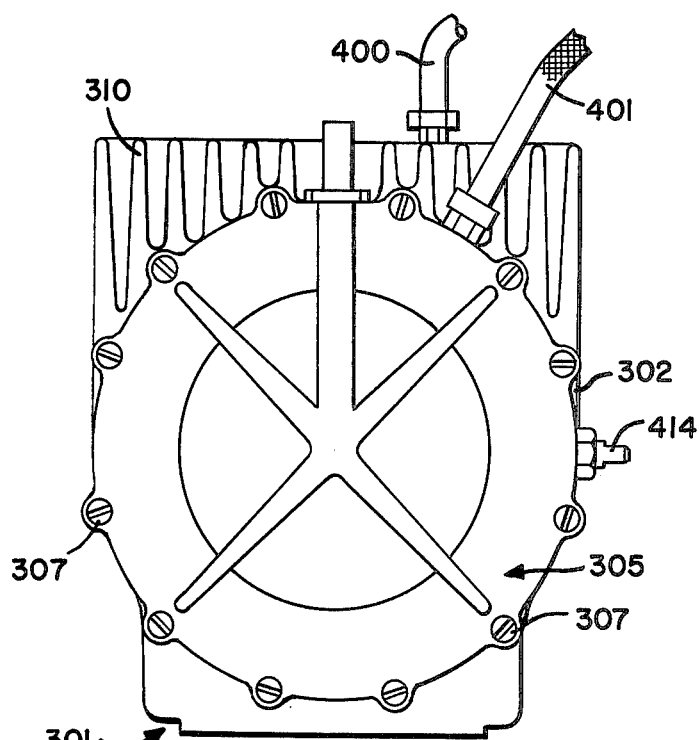
FIG. 14 is an underneath view of the cell illustrated in FIG. 12.
Figure 15:
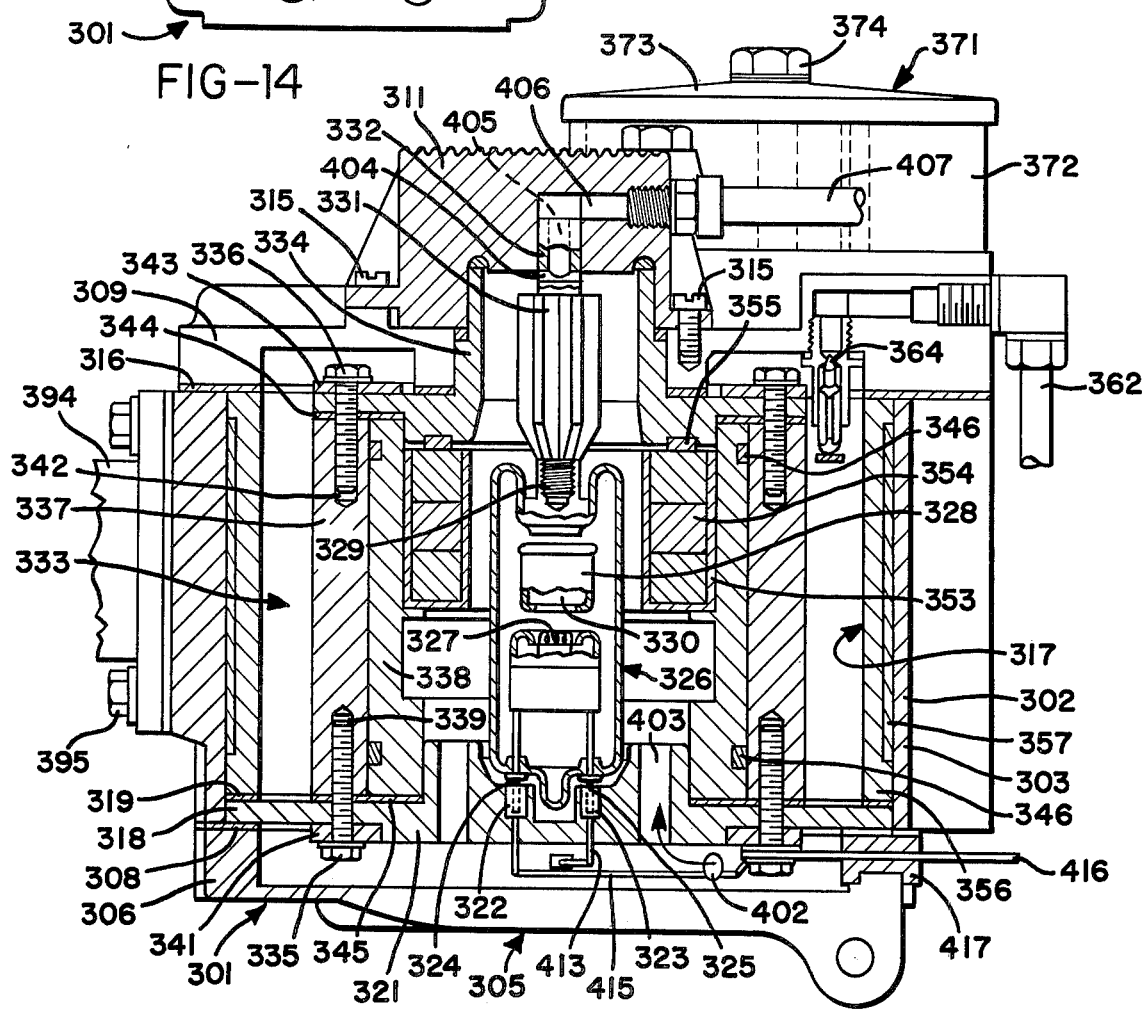
FIG. 15 is a vertical cross-section on the line 15—15 in FIG. 12.
Figure 16:
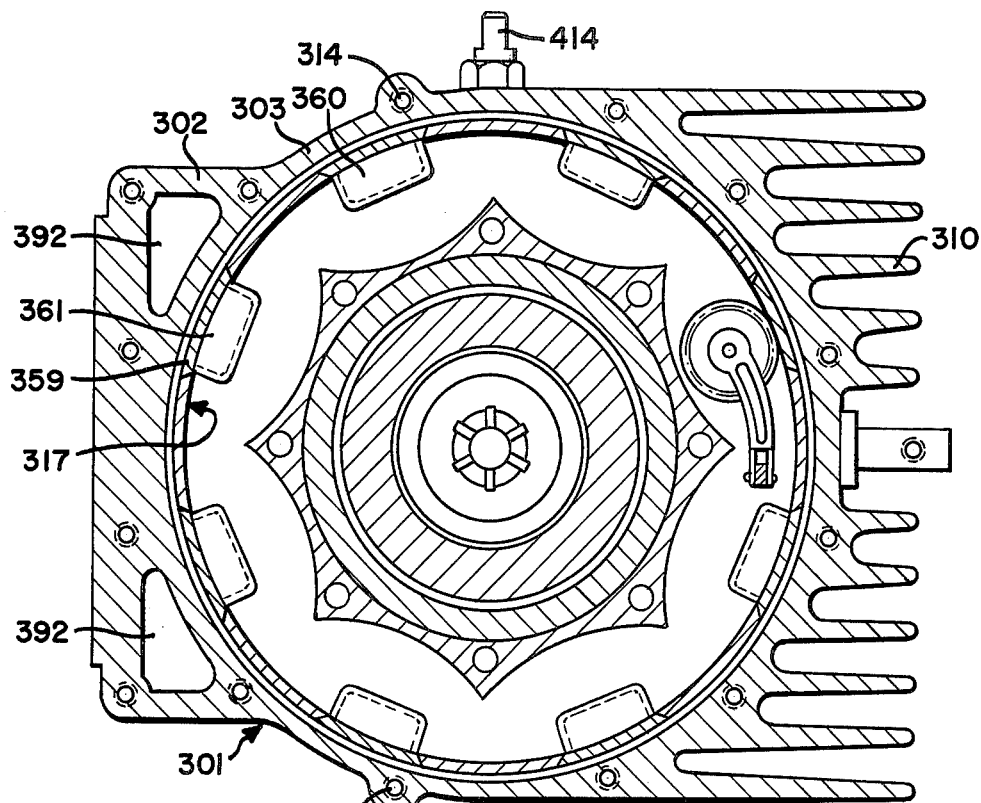
FIG. 16 is a horizontal cross-section through the cell of FIG. 12.
Figure 17:
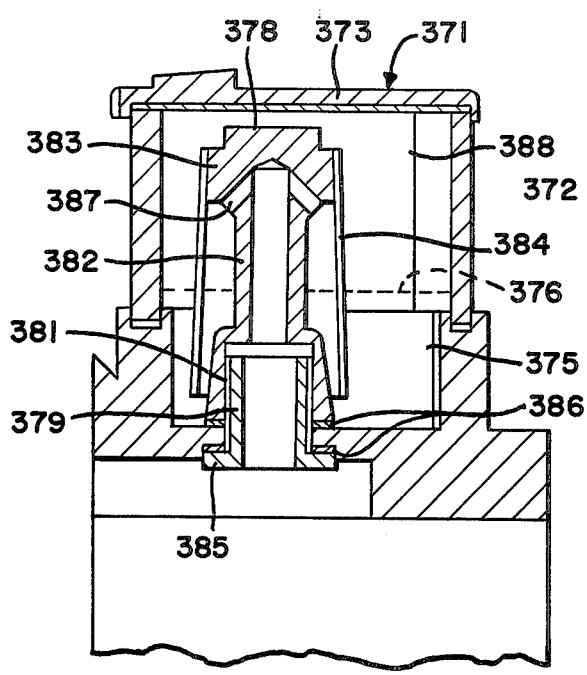
FIG. 17 is a cross-section on the line 17—17 in FIG. 12.
Figure 18:
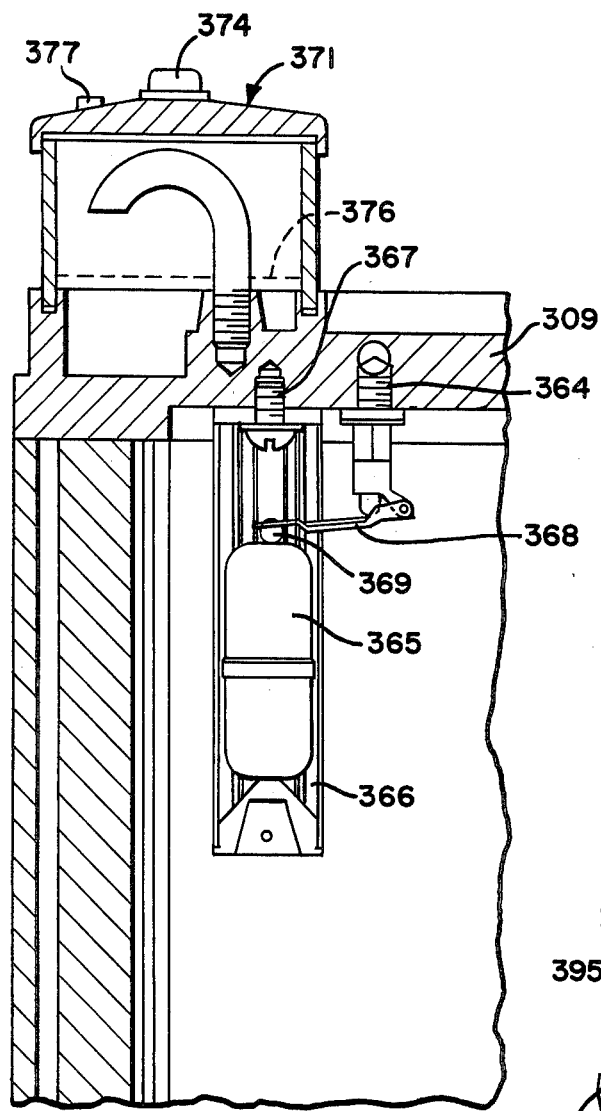
FIG. 18 is a cross-section on the line 18—18 in FIG. 12.
Figure 19:
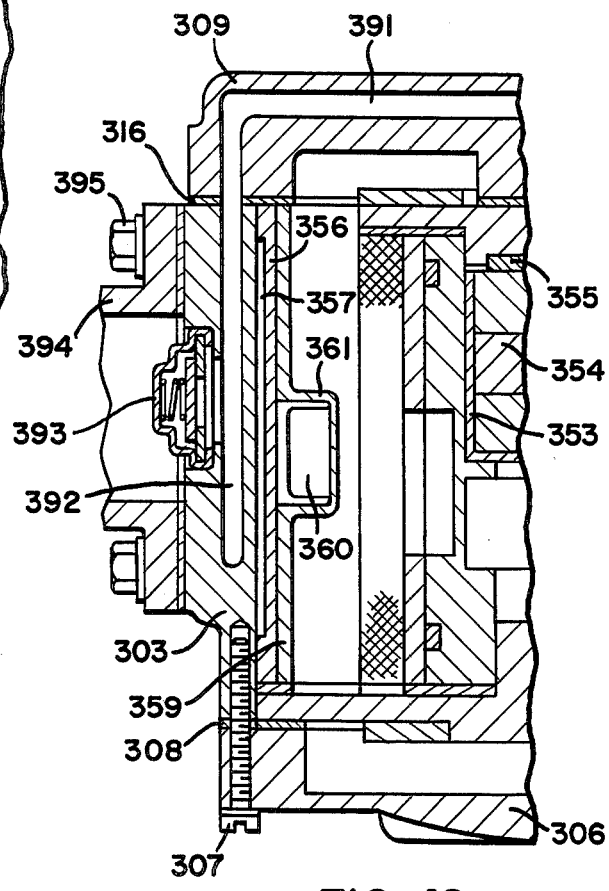
FIG. 19 is a cross-section on the line 19—19 in FIG. 12.

FIG. 11 is a circuit diagram for a modification of the apparatus of FIGS. 8 to 10. In this case the physical construction of the electrolytic cell as illustrated in FIGS. 8 and 9 remains unchanged but instead of applying a constant 12 volt DC potential between the anode and cathode, the anode is connected via a control device 300 to the output side of relay RL1. The output side of relay RL1 provides a constant 12 volt DC potential and control device 300 serves to modify this before it is applied to the anode. The decomposition potential for water is 1.8 volts and this is the theoretical minimum for electrolysis of water to proceed. In practice it is necessary to supply an additional voltage, termed overvoltage, and this depends on the physical characteristics of the electrolytic cell and the quantity of electrolyte. If the overvoltage is exceeded no improvement is achieved and the additional voltage is simply wasted in the generation of heat. The purpose of control device 300 is to ensure that the necessary overvoltage is supplied but additional voltage is minimized. It may also serve to prevent backflow of EMF from the electrolyte to the circuit. It may, for example, comprise a diode or a number of diodes in series to provide a step-down in voltage from the output side of relay RL1 and a consequent increase in current. It may alternatively include means for producing a pulsating DC voltage to be applied to anode 12. Various standard switching circuits could be used for this purpose and in particular a standard multi-vibrator circuit could be used. If a pulsating current is used it is necessary to keep the pulse rate below about 10,000 pulses per minute otherwise the pulsating current induced in the electrolyte will adopt an alternating current characteristic which will retard electrolysis.

Experiments performed on small devices such as that illustrated, have indicated that, in order to produce the necessary short wave electromagnetic radiation, the electric output from transformer TR2 must be at least 10,000 volts, otherwise no appreciable gamma radiation is produced. Although increases in voltage produces increased radiation, the voltage and consequent radiation output must be matched to the physical characteristics of the cell and the amount of electrolyte used. The electric circuit already described produces about 30,000 volts and we have found that this is an optimum for the particular apparatus illustrated. It is also necessary, in order to avoid heating problems in the electrical circuit, that the pulse rate of the electric discharge be greater than 5,000 pules per minute, and preferably of the order of 10,000 pulses per minute.

It has further been found that the short wave radiation must have an intensity of at least 6 milli-Roentgen/hour to produce significant radiolysis of water in the apparatus according to the invention. The intensity of radiation required will of course depend on the size of the installation and the amount of electrolyte irradiated but it is believed that 6 milli-Roentgen/hour must be regarded as an absolute minimum to achieve any significant result even in small apparatus. Apparatus constructed in accordance with FIGS. 8 to 10 has produced a gamma radiation output of 26 to 28 milli-Roentgen/hour which is quite adequate to produce rapid radiolysis of the electrolyte in such apparatus.

FIGS. 12 to 26 illustrate a modified and improved apparatus in which the electrolyte is irradiated by short wave length electric radiation generated by a radiation tube located at the centre of the cell within a hollow tubular anode of the cell. The radiation tube produces a 360° spread of radiation which radiates outwardly through holes or windows in the anode to provide intense irradiation of the electrolyte. Permanent magnets are installed within the anode and within the cathode to produce a carefully shaped magnetic field within the cell. A recirculating flow of oil passes through the anode and around the radiation tube to extract heat from the cell and to prevent sparking between the radiation tube and other components of the cell.

The electrolytic cell of the apparatus illustrated in FIGS. 12 to 26 is denoted generally as 301. It comprises an outer casing 302 having an aluminium peripheral wall 303 and top and bottom closures 304, 305. Peripheral wall 303 incorporates cooling fins 310. Bottom closure 305 is comprised of a non-magnetic stainless steel bottom plate 306 which is clamped to the bottom end of the peripheral casing wall 303 by means of clamping bolts 307 which fit into tapped holes in the casing wall. The interface between bottom plate 306 and casing wall 303 is sealed by an annular gasket 308.

Top closure 304 is comprised of a non-magnetic stainless steel top plate 309 and a plastic cover 311. Top plate 309 is fastened to the upper end of casing wall 303 by clamping bolts 313 which screw into tapped holes 314 in the casing wall and plastic cover 311 is fastened to top plate 309 by fastening screws 315 so as to cover a central opening in the top plate. The interface between top plate 309 and casing wall 303 is sealed by an annular gasket 316.

A tubular cathode assembly 317 is fitted closely within casing wall 303. The upper end of this cathode assembly engages gasket 316 and its lower end provides an abutment for the outer rim of a plastic bottom disc 318 which is held clamped to the bottom of the cathode assembly by bottom plate 306. A sealing gasket 319 is located between the bottom end of the cathode assembly and the plastic bottom disc 318.

Plastic bottom disc 318 has a central boss portion 321 which embodies socket terminals 322, 323 for the pins 324, 325 of a short wave length electromagnetic radiation tube denoted generally as 326 disposed at the centre of the cell. Radiation tube 326 comprises a partially evacuated glass walled envelope which houses a shielded filament winding 327 and an anode 328 having a tungsten insert 330 providing a flat target surface. The ends of filament winding 327 are electrically connected to terminal pins 324, 325 and the anode 328 is connected by a screw connection 329 to a metal component 331 which has a finned body and an upper stem 332 which projects into a hole in the underside of plastic cover 311. As will be described in more detail below metal member 331 serves as an electrical connector through which to supply high voltage to the anode of the radiation tube and also as a heat sink for the radiation tube.

Radiation tube 326 is surrounded by an anode assembly denoted generally as 333 which is clamped between bottom plastic disc 318 and an upper plastic disc 334 by means of lower clamping bolts 335 and upper clamping bolts 336. The anode assembly comprises a non-magnetic tubular metal anode 337 within which is force fitted a thick plastic liner sleeve 338. The stems of bolts 335 screw into tapped holes 339 in the bottom of anode 337 and their heads bear against a metal ring 341 fitted to the underside of plastic bottom disc 318. The stems of bolts 336 screw into tapped holes 342 in the upper end of anode 337 and their heads bear against a metal retaining ring 343 fitted to an upper face of plastic disc 334.

A gasket 344 is compressed between the outer rim of upper plastic disc 334 and the upper ends of anode 337 and anode liner 338 and a smaller gasket 345 is compressed between the lower plastic disc 318 and the lower ends of the anode and anode liner. A pair of O-ring seals 346 are disposed in circumferential grooves in the outer periphery of liner 338 adjacent the top and bottom ends of the cathode assembly so as to form seals ensuring the separation of the electrolyte which surrounds the anode and the oil which flows through the interior of the anode.

As is most clearly seen in FIG. 20 the outer periphery of anode 337 is machined to form eight circumferentially spaced flutes 347 which have arcuate surfaces meeting at sharp crests 348 defined between the flutes. The whole of the outer peripheral surface of the anode is knurled to produce small pyramidal projections so as to increase the effective surface area of the anode and to promote separation of gas bubbles at that surface. The anode is made of a non-magnetic material, preferably nickel plated brass.

The tubular wall of the anode is perforated by eight holes or windows 349 disposed centrally of the flutes (i.e. midway between crests 348) and midway between the ends of the anode.

Referring to FIG. 21, the outer periphery of anode liner 338 has eight blind bores 351 which register with the holes 349 in the anode when the liner is fitted into the anode. The liner can thus serve to separate the electrolyte from the oil within the anode but the wall thickness of the liner is reduced to a minimum at the anode holes so as to present minimum obstruction to the short wave length electromagnetic radiation generated by radiation tube 326 as that radiation spreads out from tube 326 and through the anode holes.

Anode liner tube 338 has an inner circumferential flange 352 located adjacent the tops of anode holes 349 and liner bores 351. This flange supports an annular plastic casing 353 which contains a stack of three annular permanent magnets 354. The magnets are firmly held in position by six rubber pads 355 which are compressed between the uppermost magnet and upper plastic disc 334. As will be described below magnets 354 produce a strong magnetic field within the cell. In order to produce the highest possible flux density, they are preferably of the cobalt samarium type.

Cathode assembly 317 comprises a cathode tube 356, the outer periphery of which is recessed to receive an outer lead sheath 357 which serves as a radiation shield. Unlike the anode, the cathode is made of a magnetic material. Preferably it is constructed of nickel plated mild steel. Its inner periphery has eight vertical dovetail slots 358 arranged at equal circumferential spacing. Seven of these slots receive plastic strips 359 which incorporate small magnet housings 361. Seven permanent magnets 360 are installed in housings 361 by insertion through openings 362 which are then sealed with epoxy resin before the strips 359 are fitted to the cathode tube. The remaining slot 358 of cathode tube 356 is fitted with a plain plastic strip 363 which does not incorporate a magnet housing.

The cathode assembly is a neat fit within the peripheral wall 303 of the outer casing 302 of the cell and it is installed such that the seven cathode magnets 360 are radially aligned with the centres of anode flutes 347. They are therefore generally aligned with seven of the anode holes 349. The exposed parts of the inner periphery of cathode tube 356 serve as cathode strips the centre-lines of which are radially aligned with the anode crests 348. As in the previous embodiments the sum of the surface widths of these strips are equal to the total of the surface widths of the anode flutes.

The electrolyte chamber 361 between the anode and the cathode is initially charged with electrolyte through a filler opening in top plate 309 which is then closed by a screw plug 370. This chamber receives make-up water from a supply pipe 362 via a water inlet passage 363 in top plate 309 and through a needle valve 364 which is controlled by a float 365. Float 365 is formed as a generally cylindrical hollow shell of non-magnetic steel which moves vertically within a plastic cage 366 fastened to the underface of top plate 309 by a fastening screw 367. The float and cage are disposed within the electrolyte chamber adjacent the cathode strip 363, which is not fitted with a cathode magnet in order to allow sufficient space to accommodate the float. The float acts on water inlet valve 364 via a stainless steel actuator arm 368 which is connected to the float through an electrically insulating plastic connector 369.

A pair of gas collection vessels denoted generally as 371 are mounted on metal top plate 309. Each of these vessels comprises a transparent plastic side wall 372 covered by a metal lid 373. The lid is fitted with a central clamping bolt 374 which screws into a tapped hole in cover plate 309 to clamp the lid and the side wall to the cover plate. As most clearly seen in FIGS. 17 and 18 the upper face of top plate 309 is machined so as to form a well 375 at the bottom of each gas collection vessel 371 and this well is filled with water to the level indicated at 376. This water may be topped up from time to time as required through filler openings in lids 373 which are closed by screws 377.

The mixture of hydrogen and oxygen gases liberated into the upper part of electrolyte chamber 361 passes upwardly into collection vessels 371 via a pair of gas valves 378. Each gas valve comprises a lower hollow spigot member 379, which extends upwardly through a hole in metal top plate 309 and is screw connected at 381 to the bottom end of a central valve stem member 382 having an enlarged head 383 from which an outer skirt 384 depends below the level of water in the gas collection vessel. The lower end of spigot 379 has a flange 385 so that a clamping action is produced between this flange and the bottom of valve stem 382 to clamp the valve to top plate 309 when screw connection 381 is tightened. A pair of gaskets are provided to seal against leakage of water from the gas collection vessel.

Spigot 379 and valve stem 382 are hollow and gas from the electrolyte chamber flows upwardly through them and thence downwardly and outwardly through four holes 387 in valve head 383 into the space within the valve skirt 384. The gas must then bubble downwardly through the water in the well at the bottom of the gas collection vessel to escape into the gas collection chamber 388 in the upper part of the collection vessel.

The mixture of hydrogen and oxygen gas which accumulates in the collection chambers 388 of vessels 371 flows from these chambers through crooked tubes 389 into a pair of gas flow passages 391 extending along metal tube plate 309 to a pair of vertical gas flow ducts 392 formed in the peripheral wall 303 of the outer casing. The gas then passes from ducts 392 via spring loaded one way valves 393 to a delivery pipe 394 bolted to the side of the cell casing by bolts 395, whence it may be piped to storage or a point of consumption.

A tube 400 is fitted to a tapping in top cover 309 which connects with the top of the electrolyte chamber. Tube 400 therefore monitors the pressure within the electrolyte chamber. Its other end is connected to a pressure switch in the electrical circuitry of the apparatus as will be explained below.

The cell has a forced flow oil circulation system whereby oil is passed into the bottom of the cell and upwardly through the interior of the anode assembly to completely surround radiation tube 326 whereafter it passes out from the top of the cell and is recirculated. The oil displaces air from the interior of the cell, which might otherwise permit sparking to occur between radiation tube 326 and other components of the cell, and it also serves to extract heat from the cell and thus prevent overheating of the radiation tube. The oil enters the bottom of a cell from an input pipe 401 through an inlet port 402 and passes upwardly through holes 403 in the central boss portion of bottom plastic plate 318. It then flows upwardly through the interior of the anode assembly and around the radiation tube and finned metal member 331. The upper stem portion 332 of member 331 has a transverse bore 404 connecting with a central vertical bore 405 through which the oil flows to an oil outlet passage 406 in plastic cover 311 and thence to an oil outlet pipe 407. The oil may be re-circulated by a pressure pump through a cooling radiator and accumulator or expander unit to accommodate thermal expansion of the oil. Because of its finned construction, member 331 provides excellent heat transfer from the radiation tube to the circulating oil which can flow upwardly along the channels defined between the vertical fins. Member 31 also serves as an electrical connector whereby a high tension connection is made to the anode 328 of the radiation tube. This connection is made from a high voltage cable 408 connected via a plastic bolt 409 in plastic cover 311 to a silver plated brass conductor 411 which bears against the stem portion 332 of connector member 331 and is backed by a flexible rubber seal 412.

The terminal 323 for the tube filament 327 is connected via a wire 413 to a positive electrical input lead 414 and the other filament terminal 322 is connected via a wire 415 directly to the outer casing of the cell whereby it is earthed. Cathode tube 356 is earthed by its engagement with the outer casing of the cell and anode 337 is electrically connected via one of the clamping studs 335 to a positive input lead 416 which enters the lower part of the outer casing through a rubber seal 417.

Before describing the electrical circuitry for the apparatus illustrated in FIGS. 12 to 26, the general operation of the apparatus will be described. To start operation of the cell electrolyte chamber 361 is charged with a 25% aqueous solution of potassium hydroxide.

A constant DC potential of 4.2 volts is applied between anode 337 and cathode 356. The filament 327 is supplied with a regulated positive voltage of 2.65 volts and a very high pulsating DC voltage is applied between the filament and the anode of the radiation tube. Typically the voltage between the filament and the anode will be 40 KV with a superimposed ripple voltage of 2–4 KV. Under these conditions the electron bombardment of the anode produces a 360° band of radiation indicated by the dotted lines 421 in FIG. 25. As indicated by these dotted lines the band of radiation fans downwardly from the horizontal plane of the flat target surface of the radiation tube anode through a scattering angle of approximately 15°. The radiation comprises high energy photons of wave length less than $10^{-10}$ meters. Tests indicate that the radiation intensity from the tube is of the order of 30,000 Roentgen/hour. This high flux of photons releases large numbers of neutrons within the tungsten target of the radiation tube and the tube therefore also acts as a pulsed source of neutrons which radiate with the high energy photons in the radiation beam. The radiation beam extends outwardly through the holes 349 in anode 337 into the electrolyte chamber and because of reflections from the cathode a band of the electrolyte within the electrolyte chamber is intensely irradiated.

The anode magnets 354 and cathode magnets 360 produce an intense magnetic field the shape of which is indicated by the dashed lines 422, 423. The lines 422 indicate closed loop magnetic field lines which extend downwardly from anode magnets 354 to intersect the radiation beam at approximately 90° then curve inwardly and upwardly to extend vertically through the cathode of radiation tube 326 and through metal member 331 whereafter they curve outwardly and downwardly to the upper ends of the anode magnets. In the region between the radiation tube filament and anode the magnetic field serves to accelerate the electrons which bombard the radiation tube anode and so contributes to the energy of the radiation produced by the tube.

Lines 423 show outer field loops which extend from the bottom of anode magnets 354 and across to cathode magnets 360 whence they pass upwardly through the cathode and back in a closed loop to the upper end of the anode magnets. Cathode magnets 360 serve to draw these magnetic field lines so that they pass outwardly through the electrolyte chamber in the region where the electrolyte is subjected to intense irradiation. The magnetic field in this region of the electrolyte chamber therefore provides preferred paths for the radiation photons which then tend to pass through the electrolyte in radial directions. The intersection of the magnetic field with the radiation photons within the electrolyte produces a "spin flip" effect in the protons released within the electrolyte which increases their energy level.

The magnetic field lines within the electrolyte chamber provide preferred paths for the energetic photons of the electromagnetic radiation and the ions within the electrolyte will also move along these field lines so that the probability of collisions between the ions and energetic photons within the electrolyte is greatly increased. Thus there is a high rate of decomposition by radiolysis and a liberation of decomposition products produced by electrolysis. The decomposition products are in the form of highly ionised hydrogen and oxygen gases. Moreover, because of nuclear capture of neutrons associated with the radiation beam the ionised hydrogen gas which is produced will comprise a much higher proportion of deuterons than in naturally occurring hydrogen. Thus a mixture of highly ionised oxygen and hydrogen gases including a significantly high proportion of deuterons accumulates in the upper part of the electrolyte chamber and passes upwardly into collection vessels 371 whence it flows through crooked tubes 389 and transfer passes 391 and ducts 392 to outlet pipe 394.

Figure 26:
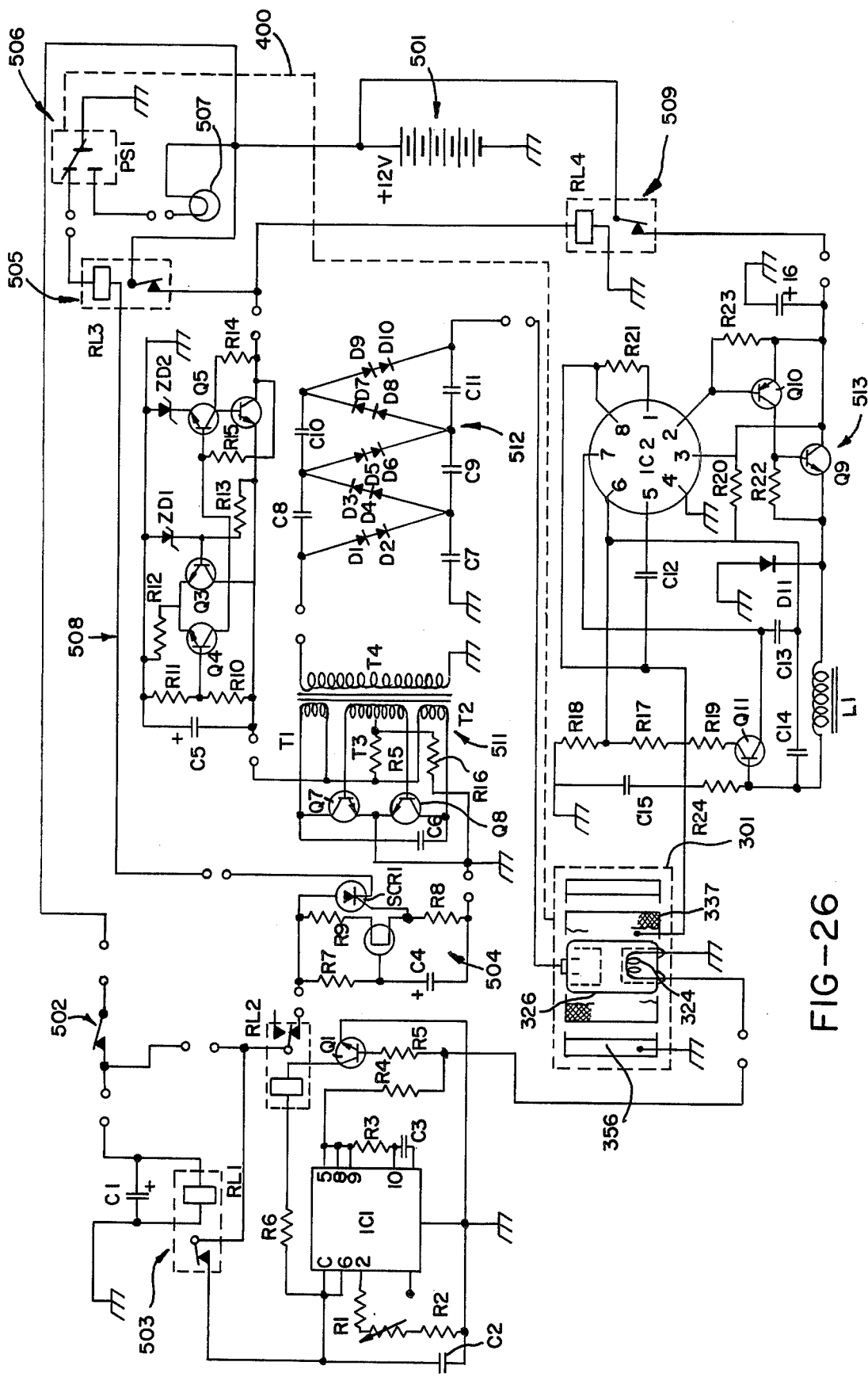
FIG. 26 is an electric circuit diagram for the apparatus illustrated in FIGS. 12 to 25.

In order to achieve the above results the magnetic field should have a flux density greater than 500 Grauss within the electrolyte, and preferably of the order of 1800 Grauss. The electrical circuit for the apparatus shown in FIGS. 12 to 25 is illustrated in FIG. 26. As shown in that Figure the circuitry is energised by a 12 volt battery 501. A simple on/off master control switch 502 provides positive voltage to a radiation tube filament voltage regulator denoted generally as 503 and to a timer circuit denoted generally as 504. The filament voltage regulator provides controlled positive voltage to the filament 327 of radiation tube 326. Timer 504 energises a master control relay 505 which is connected to the common negative through a pressure control switch 506. Pressure control switch 506 provides negative voltage to an indicator lamp 507 the other side of which receives positive voltage from battery 501. 508 supplies a controlled positive voltage to an inverter circuit denoted generally as 511 which in turn supplies a square wave form of AC voltage to a voltage multiplier circuit produces the high voltage DC potential difference which is applied to radiation tube 326. This voltage is approximately 40 KV DC with a superimposed sharply spiked ripple of 2-4 KV.

The positive voltage for anode 337 of cell 301 is provided through a switching power supply circuit denoted generally as 513 which is energised by the high power relay 509.

The pressure sensing tube 400 from the electrolyte chamber of cell 301 is indicated in the circuit diagram by a broken line and is connected to pressure control switch 506.

The major components of the electrical circuit will now be described sequentially in detail.

Filament Voltage Regulator (503)

When positive voltage is supplied through the master control switch 502 and energises the relay RL1 it will supply current to voltage regulator IC1 through the fixed contact of the relay. The same contact will supply current to timer 504 through the normally closed contact of relay RL2. Capacitor C1 is connected between the negative and positive supply lines and provides a delay of 1.5 seconds when relay RL1 turns off to ensure that the high voltage supplied to radiation tube 326 is turned off before the regulated filament voltage is turned off before the regulated filament voltage is turned off. The output voltage of regulator IC1 is controlled by the set level of resistance of a resistor network R1, R2 and RV1 (variable resistor). Capacitor C2 acts to stabilise the circuit against input voltage supply transients. Resistor R3 isolates capacitor C3 from the output of the regulator IC1 and balances the input divider. Capacitor C3 is used to roll off the error amplifier in regulator IC1 and to provide frequency compensation. If the filament breaks transistor Q1 is turned on by current provided through resistor R4 and R5 and the relay RL2 to stop supply current to timer 504. The values of resistor R4 and R5 are selected to prevent sufficient current supply to energise relay RL2 during normal operation of the radiation tube. When transistor Q1 and relay RL2 are activated a resistor R6 drops the 12 volt supply to a level where it does not overload the 6 volt relay RL2.

Timer (504)

Time delay circuit 504 provides current to the master control relay 505. When power is supplied through the normally closed contact point of relay RL2, the capacitor C4 is charged through resistor R7 until the voltage across capacitor C4 reaches the trigger voltage of unijunction transistor Q2. The time delay is controlled by the ratio of capacitor C4 and resistor R7 and provides a delay of 2 to 3 seconds. When unijunction transistor Q2 turns on and discharges capacitor C4, through resistor R8, it provides a voltage pulse which is applied to the gate of SCR1 and will turn SCR1 on. The resistor R9 will control the pulsed current supplied to the gate of SCR1. Master control relay RL4 acts as a load for the device, and thus, when SCR1 turns on, the master control relay RL3 latches over and provides, through its contact point, positive voltage to drive the Inverter Voltage Regulator 508 and energises high power relay RL4. The master control relay 505 is connected to the negative supply through the normally closed contact point of pressure controlled switch 506. When the gas pressure in cell 301 rises above a certain level, the pressure controlled switch 506 changes over to provide negative voltage to the indicator lamp 507 and to stop the function of master control relay 509 until the gas pressure reduces to normal. During this period the complete circuit is inactive except for the tube filament supply.

Inverter Voltage Regulator (508)

The series pass voltage regulator 508 senses changes in the output voltage by the differential amplifier transistors Q3 and Q4 and its associated circuitry resistors R10, R11, R12 and R13 and zener diode ZD1. Resistor R13 provides for a large current to flow through ZD1 and since it is much larger than the current flowing through resistors R10 and R11 makes the reference voltage generated by zener diode ZD1 at point A virtually independent of changes in voltage.

If there is any change to voltage, this causes a complementary change in the base current to transistor Q5. This is achieved by using transistor Q4 to control the current through transistor Q5. Transistor Q5 is used as a common emitter driver and regulates the base current to the series pass transistor Q6. Zener diode ZD2 provides the reference voltage for this arrangement of transistors Q5 and Q6 and keeps the voltage at the base of Q6 constant and hence only varying the control current through transistor Q5. Resistors R14 and R15 provide correct biasing of transistors Q5 and Q6.

Capacitor C5 maintains low output impedance at high frequencies where the gain transistors Q3 and Q4 is low. The value of resistor R12 is selected to draw sufficient operating current through transistors Q3 and Q4, such that transistor Q4 is in its active region for large possible variations in voltage. The Inverter Voltage Regulator receives 12 volt positive supply through master control relay 505 and provides a regulated voltage of approximately 8 volts to the Inverter 511.

Inverter (511)

The inverter is a DC to AC converter using a transistor oscillator. The transistors Q7 and Q2 are high speed switching devices and operate to provide an alternating high frequency current, frequency 3KHz to 25KHz, in primary coils T1 and T2. The starting signal applied to the centre tap of coil T3 is controlled by the resistor network provided by resistors R15 and R16 such that its magnitude will provide sufficient base drive to the transistors Q7 and Q3 to enable them to trigger alternatively. Transistors Q7 and Q8 will provide opposite flow of current in the coils T1 and T2 which alternates the flux in the ferrite core FC1 from positive to negative. The secondary coil generates a high voltage output by means of the large turns ratio between primary and secondary coils. The capacitor C6 will act as a filter and prevent input voltage transients.

Voltage Multiplier (512)

The input voltage to the voltage multiplier is the high voltage AC waveform from the inverter secondary winding T4. Typically this will be about 18KV. The operation of the circuit can be described by considering alternative positive and negative cycles of the high voltage AC waveform. On the first positive half cycle the diodes D1 and D2 are forward biased and charge capacitor C7 to the peak value of the positive cycle. On the negative cycle following diodes D1 and D2 are reversed biased and diodes D3 and D4 are forward biased. Capacitor C7 discharges through diodes D3 and D4 to charge capacitor C8. At the next positive half cycle capacitor C7 is charged again by diodes D1 and D2 while the voltage across capacitor C8 forward biases diodes D5 and D6 which enables capacitor C8 to charge capacitor C9.

This process is repeated on the next negative half cycle charging capacitor C10 and in a similar fashion capacitor C11 is charged on the following positive half cycle. At this point (2$\frac{2}{3}$ complete cycles since the initiation of the sequence) capacitors C7, C9 and C11 are each charged to the full zero to positive peak voltage of the secondary winding T4 and since the capacitors are in series with each other the voltage with respect to earth at the output terminal of the voltage multiplier is three times the zero to peak value.

This process continues for as long as the input voltage is present and because of the rectifying action of diodes D1 – D6.

The output as well as being multiplied to three times the input voltage is also rectified from an AC voltage to a DC voltage. However, the regulation of this type of circuit is such that the DC waveform has a fairly large superimposed AC ripple voltage. This is typically 2 – 4KV in a total output voltage of 46KV.

Switching Power Supply (513)

The switching power supply circuit operates by means of the pass transistor Q9 and its associated driver transistor Q10 being rapidly switched on and off by the voltage regulator IC2. A five volt output can be obtained by this method because the transistors are switched on until the output voltage is just above 5 volts. They are then switched off until the voltage drops to just below 5 volts. This process continues and thus the output voltage is a DC voltage with a slight superimposed AC ripple.

Resistors R17 and R18 feed back a fraction of the output voltage to IC2 and this is compared to an internal reference voltage in IC2. The result of this comparison controls the switching of transistors Q9 and Q10. Resistor R20 improves output regulation versus input voltage changes by feeding a small compensating voltage proportional to the input voltage to IC2.

Capacitors C12 and C14 provide AC feedback to IC2 which causes the output voltage to be independent of the output ripple voltage across the capacitor C15. Capacitor C13 is used to roll off the error amplifier in the internal circuitry of voltage regulator IC2 and to provide frequency compensation. Capacitor C16 improves the transient response of the power supply circuitry 513. Resistor R21 establishes the desired level of base drive to transistor Q10 and determines the hysteresis voltage across resistor R19.

Transistor Q11 provides current limiting action by sensing the voltage drop across resistor R24. When the output current exceeds a predetermined limit transistor Q11 turns on cutting off the drive current to IC2. Resistor R19 provides the necessary bias for transistor Q11 as do resistors R22 and R23 for transistors Q9 and Q10 respectively.

When transistors Q9 and Q10 turn on, the current through inductor L1 increases in an exponential fashion. There is also a corresponding rise in voltage which is sensed by resistors R18 and R17. When these resistors sense that the voltage has reached its upper level transistors Q9 and Q10 are turned off. As the current was increasing through inductor L1, that inductor was storing energy in its associated magnetic field. When transistors Q9 and Q10 turn off the combination D11, L1 and C15 act as the only power source with diode D11 being forward biased which provides for a continuous current path for the current through inductor L1.

Transistors Q9 and Q10 and diode D11 must be fast switching devices to ensure efficient operation of the regulator as it is during switching that most of the losses occur. The combination of inductor L1 and capacitor C15 provides a filter to minimise the output AC ripple on the DC output Eo.

A complete components list for the illustrated circuit is as follows:

| | | |
|---|---|---|
| $R_1$ | 10K OHM | ¼ WATT |
| $R_2$ | 3K OHM | ¼ WATT |
| $R_3$ | 5.6K OHM | ¼ WATT |
| $R_4$ | 0.68 OHM | 5 WATT |
| $R_5$ | 12K OHM | ¼ WATT |
| $R_6$ | 68 OHM | ¼ WATT |
| $R_7$ | 1 MEGOHM | ¼ WATT |
| $R_8$ | 220 OHM | ¼ WATT |
| $R_9$ | 470 OHM | ¼ WATT |
| $R_{10}$ | 2.2K OHM | ¼ WATT |
| $R_{11}$ | 2.7K OHM | ¼ WATT |
| $R_{12}$ | 680 OHM | ¼ WATT |
| $R_{13}$ | 2K OHM | ¼ WATT |
| $R_{14}$ | 33 OHM | 5 WATT |
| $R_{15}$ | 100 OHM | ¼ WATT |
| $R_{15A}$ | 18 OHM | 5 WATT |
| $R_{16}$ | 1.5 OHM | 5 WATT |
| $R_{17}$ | 5.5K OHM | ¼ WATT |
| $R_{18}$ | 3.1K OHM | ¼ WATT |
| $R_{19}$ | 8 OHM | 2 WATT |
| $R_{20}$ | 1.2 MEG | ¼ WATT |
| $R_{21}$ | 5 OHM | 2 WATT |
| $R_{22}$ | 40 OHM | 2 WATT |
| $R_{23}$ | 15 OHM | 5 WATT |
| $R_{24}$ | .006 OHM | |
| $R_{V1}$ | 10K OHM TRIMPOT | |
| $R_{L1}$ | 12V DC RELAY | |
| $R_{L2}$ | 6V DC RELAY | |
| $R_{L3}$ | 12V DC RELAY | |
| $R_{L4}$ | 12V DC RELAY | |
| $D_1$ | ED1 7639 35KV | |
| $D_2$ | ED1 7639 35KV | |
| $D_3$ | ED1 7639 35KV | |
| $D_4$ | ED1 7639 35KV | |
| $D_5$ | ED1 7639 35KV | |
| $D_6$ | ED1 7639 35KV | |
| $D_7$ | ED1 7639 35KV | |
| $D_8$ | ED1 7639 35KV | |
| $D_9$ | ED1 7639 35KV | |
| $D_{10}$ | ED1 7639 35KV | |
| $D_{11}$ | 75 AMP IAV. | |

| | |
|---|---|
| $C_1$ | 1000 μF ELECTROLYTIC |
| $C_2$ | 1 μF TANTALOM |
| $C_3$ | 2000 pF POLYESTER |
| $C_4$ | 10 μF TANTALUM |
| $C_5$ | 2500 μF ELECTROLYTIC |
| $C_6$ | .002 μF POLYCARBONATE |
| $C_7$ | 1800 pF 30KVWDC |
| $C_8$ | 1800 pF 30KVWDC |
| $C_9$ | 1800 pF 30KVWDC |
| $C_{10}$ | 1800 pF 30KVWDC |
| $C_{11}$ | 1800 pF 30KVWDC |
| $C_{12}$ | .01 μF POLYESTER |
| $C_{13}$ | 220 pF DISC CERAMIC |
| $C_{14}$ | .02 μF POLYESTER |
| $C_{15}$ | 2500 μF ELECTROLYTIC |
| $C_{16}$ | 420 μF ELECTROLYTIC |
| $Q_1$ | 2N3568 |
| $Q_2$ | 2N2647 |
| $Q_3$ | 2N1304 |
| $Q_4$ | 2N1304 |
| $Q_5$ | 2N3055 |
| $Q_6$ | 2N6274 |
| $Q_7$ | 2N3773 |
| $Q_8$ | 2N3773 |
| $Q_9$ | 2N6274 |
| $Q_{10}$ | 2N6191 |
| $IC_1$ | MPC 1000 VOLT REGULATOR |
| $IC_2$ | LM 305 |
| $SCR_1$ | G.E. C106D |
| $FC_1$ | FERRITE "E" CORE |
| $L_1$ | 5 μH |
| $PS_1$ | PRESSURE ACTIVATED MICROSWITCH 5A DC AT 28 VOLTS |
| $Z_{D1}$ | B27 96 C6V2 105W |
| $Z_{D2}$ | 6.2V 10 WATT |

Apparatus of the type illustrated in FIGS. 12 to 25 has been constructed and tested and has been found to operate most efficiently. The results of a typical test conducted over a period of 60 minutes and 39 seconds are tabulated in table A. As shown in that table the voltage and current inputs between the anode and the cathode of the cell and to the radiation tube were monitored. This enables a calculation of the total electrical energy input to the cell as follows:

| Voltage | | Amperage | | Time in Seconds | | Watt seconds |
|---|---|---|---|---|---|---|
| 8.5 | × | 17 | × | 75 | = | 11,220 |
| 8.5 | × | 17 | × | 523 | = | 75,574 |
| 8.6 | × | 17 | × | 162 | = | 23,684 |
| 8.6 | × | 17 | × | 830 | = | 121,346 |
| 8.5 | × | 17 | × | 405 | = | 58,523 |
| 8.4 | × | 17 | × | 605 | = | 86,394 |
| 8.3 | × | 17 | × | 430 | = | 60,673 |
| 8.2 | × | 17 | × | 609 | = | 84,894 |
| | | | | 3,639 | | 522,308 |

| Between Anode and Cathode | | Time in Seconds | | Watt seconds |
|---|---|---|---|---|
| Voltage | Amperage | | | |
| 3.38 × | 70 × | 565 | = | 133,679 |
| 3.35 × | 70 × | 235 | = | 55,107 |
| 3.34 × | 70 × | 360 | = | 84,168 |
| 3.32 × | 70 × | 305 | = | 70,882 |
| 3.31 × | 70 × | 675 | = | 156,398 |
| 3.30 × | 65 × | 700 | = | 150,150 |
| 3.29 × | 62 × | 255 | = | 52,014 |
| 3.28 × | 62 × | 310 | = | 63,041 |
| 3.27 × | 61 × | 234 | = | 46,676 |
| | | 3,639 | | 812,115 |

The total electrical energy input to the cell during the test period was therefore 1,334,423 watt seconds or 0.371 kilowatt hours.

During the test seventy milliliters of water was converted to hydrogen and oxygen gas. This is equal to 3.89 moles of water and, since each mole of water produces 1 mole of hydrogen and ½ mole of oxygen, the weight of hydrogen produced during the test period was 3.89 × 2 = 7.78 grams or 0.017 pounds. Thus, the rate of electrical consumption of the cell was 21.63 kilowatt hours per pound of hydrogen produced.

One common parameter used for expressing the efficiency of an electrolytic cell is the total electrical input in kilowatt hours required to produce 1,000 standard cubic feet of hydrogen and a figure of 79 kilowatt hours per 1000 S.C.F. is regarded as 100% efficiency. The test results indicate that the illustrated apparatus requires 121 kilowatt hours per 1,000 S.C.F. and on this basis its efficiency is 65.53%.

Another basis for measuring the performance of electrolytic cells is to calculate the thermal efficiency defined as $$\frac{\text{higher heating value of hydrogen produced}}{\text{electrical energy consumed}} \times 100$$

The higher heating value of hydrogen is defined as 286 kjoules per mole. Therefore, the thermal efficiency demonstrated in the test was:

$$\frac{286 \, kj \times \frac{70}{18} \, \text{moles}}{(.371 \, kWhr \times 3600) kj} \times 100 = \frac{1112.22 \, kj}{1335.6 \, kj} \times 100 = 83.27\%$$

The above results compare very favourably with the performance of the most efficient electrolysers which are at present commercially available. A comparison with known electrolysers is set out in table B. It will be seen that the only known electrolyser which operates at the same efficiency levels is one produced by Life Systems Inc. However, this operates at very high pressure and high temperature and is not available commercially. Compared with the existing systems the present apparatus operates at very low pressure and temperature and has a high output for its size. It is also relatively cheap to produce.

TABLE A
RESULTS OF TEST ON APPARATUS OF FIGURES 12 - 26

| | |
|---|---|
| Electrolyte | 25% of KOH |
| Electrolyte volume at start of test period | 600 ml |
| Electrolyte volume at end of test period | 530 ml |
| Water converted during test period | 70 ml |
| Total duration of test period | 60 mins 39 |

TABLE A-continued

| Voltage to Inverter Circuit | | Voltage between Anode/Cathode | |
|---|---|---|---|
| Time | Volts | Time | Volts |
| 1 min 15 | 8.5 | 3 min 25 | 3.38 |
| 9 min 58 | 8.6 | 9 min 25 | 3.35 |
| 12 min 40 | 8.6 | 13 min 20 | 3.34 |
| 16 min 30 | 8.6 | 19 min 20 | 3.32 |
| 20 min 20 | 8.6 | 24 min 25 | 3.31 |
| 26 min 30 | 8.5 | 29 min 05 | 3.31 |
| 33 min 15 | 8.4 | 35 min 50 | 3.30 |
| 37 min 25 | 8.4 | 41 min 40 | 3.30 |
| 43 min 20 | 8.3 | 47 min 20 | 3.29 |
| 49 min 30 | 8.3 | 51 min 35 | 3.28 |
| 50 min 30 | 8.2 | 56 min 45 | 3.27 |
| 54 min 55 | 8.2 | 59 min 55 | 3.27 |
| 58 min 25 | 8.2 | | |
| 60 min 39 | 8.2 | | |

| Current to Inverter Circuit | | Current between Anode/Cathode | |
|---|---|---|---|
| Time | Amps | Time | Amps |
| 3 min 03 | 17 | 0 min 0 | 70 |
| steady | | 9 min 06 | 70 |
| 60 min 32 | 17 | 12 min 40 | 70 |
| | | 18 min 05 | 70 |
| | | 23 min 55 | 70 |
| | | 29 min 55 | 70 |

| High Voltage on Radiation Tube | | | |
|---|---|---|---|
| Time | KV | 36 min 30 | 68 |
| 11 min 25 | 41 | 41 min 10 | 65 |
| 19 min 55 | 41 | 47 min 40 | 64 |
| 20 min 15 | 40 | 53 min 30 | 62 |
| 28 min 10 | 40 | 56 min 20 | 62 |
| 34 min 35 | 39 | 59 min 25 | 61 |
| 39 min 05 | 39 | | |
| 42 min 50 | 38 | | |
| 48 min 40 | 38 | | |
| 53 min 05 | 37 | | |
| 57 min 45 | 37 | | |

Current between tube filament and anode varied 4.72 to 4.9 milliamps
Filament current varied 1.56 to 1.58 amps
Filament voltage varied 2.68 to 2.65 volts
Maximum electrolyte temperature 54° C

MAIN INFORMATION TAKEN FROM A PAPER TO 10TH INTERSOCIETY ENERGY CONVERSION CONFERENCE AUGUST 1975 BY KNOPIC & GREGORY OF INSTITUTE OF GAS TECHNOLOGY

| Company and Model | Commercially Available | Weight lbs. | Size L" × W" × H" | Output Rate | Electrode |
|---|---|---|---|---|---|
| TELEDYNE ISOTOPES | | | | | |
| Small | Yes | 80 | 10" × 14" × 26" | .177c.ft. per min. | Porous |
| Medium | Yes | 1000–2000 lbs. per cabinet | 33" × 74" × 64" | .177 to 7.06 c.ft. per min. | Porous |
| Large (Multiple System Packages) | Yes | | 260 s.ft. floor space per basic package | ½–4 tons per day | Porous |
| GENERAL ELECTRIC CO. | | | | | |
| Solid Polymer Electrolyte | Yes | 30 | <1 c.ft. | | Platinum |
| ELECTROLYSER CORP. - CANADA | | | | | |
| Modular Stuart Cell | | 1665 - 5135 lbs. | 44" × 12–33" × per cell | 63.6 - 350 c.ft. per hour | Nickel Plated Steel |
| Stuart Package Hydrogen Generator | | | 25" × 48" ×0 58" | 20 c.ft. per hour | Nickel Plated Steel |
| LITE SYSTEMS INC. | No | | | | Noble Metal |
| DE NORA | Yes | | ×196" × 63" | | (Gold plated nickel) Low Carbon Steel |
| COMINCO (one of largest plants in world) | | | | 41 tons per day | N.P. Anode Mild Steel |
| HORVATH SYSTEMS | | | | 1.45 liters per min. | N.P. Anode |

| Company and Model | Operating Pressure | Operating Temp. | kWhr per lb. H₂ Produced | Thermal Efficiency | kWhr per 1000 SCF |
|---|---|---|---|---|---|
| TELEDYNE ISOTOPES | | | | | |
| Small | | 130° F | 55.4 | 31.8 | 310 |
| Medium | 70–100 p.s.i.g. | | 30.4 | 58 | 170 |
| Large (Multiple System Packages) | 100 p.s.i.g. | | 25.2 | 70 | 140 |
| GENERAL ELECTRIC CO. | | | | | |
| Solid Polymer Electrolyte | | | 23.8 | 74 | 133.3 |

-continued

| MAIN INFORMATION TAKEN FROM A PAPER TO 10TH INTERSOCIETY ENERGY CONVERSION CONFERENCE AUGUST 1975 BY KNOPIC & GREGORY OF INSTITUTE OF GAS TECHNOLOGY | | | | | |
|---|---|---|---|---|---|
| ELECTROLYSER CORP. - CANADA | | | | | |
| Modular Stuart Cell | 10" WG | 70° C | 24.5 | 72 | 128 |
| Stuart Package Hydrogen Generator | | | 26.8 | 66 | 150 |
| LIFE SYSTEMS INC. | 600 p.s.i. | 220° F | 20.3 | 87 | 117 |
| DE NORA | | | 22.0 | 80 | 123.2 |
| COMINCO | | 140° F | 28.6 | 62 | 160 |
| (one of the largest plants in world) HORVATH SYSTEM | Low | 54° C | 21.6 | 83.3 | 121 |

What I claim is:

1. A method of decomposition of water to produce hydrogen and oxygen comprising the steps of
    placing an electrically conductive aqueous solution in a vessel in contact with a pair of separated electrodes,
    causing electric current to flow between said electrodes while simultaneously irradiating the aqueous solution with electromagnetic radiation of wave length less than $10^{-10}$ meters and a stream of neutrons, and
    collecting hydrogen and oxygen which accumulates at the electrodes as highly ionised gases in which the hydrogen contains a higher proportion of deutrons than in naturally occurring hydrogen.

2. A method as claimed in claim 1 wherein said electrodes are cylindrically arranged about a common centre line and wherein the electromagnetic radiation and said stream of neutrons are generated in a radiation generator disposed within the inner electrode and radiate outwardly through the inner electrode into said aqueous solution.

3. A method as claimed in claim 2, wherein a magnetic field is applied to said aqueous solution in field directions extending between said electrodes which magnetic field produces a "spin-flip" effect on protons released from the aqueous solution.

4. A method as claimed in claim 1, wherein the stream of neutrons is a pulsed stream of neutrons associated with said electromagnetic radiation and wherein the highly ionised hydrogen and oxygen gases are collected as a gaseous mixture.

5. A method of decomposition of water to produce hydrogen and oxygen comprising the steps of
    placing an electrically conductive aqueous solution in a vessel in contact with a pair of separated electrodes arranged cylindrically one within the other,
    producing by electron bombardment of an anode in a radiation tube disposed within the inner electrode a beam of electromagnetic radiation of wave length less than $10^{-10}$ meters which radiates outwardly through the inner electrode to irradiate the aqueous electrolyte between the electrodes,
    causing an electric current to flow between the electrodes and through the irradiated electrolyte, and
    collecting hydrogen and oxygen gases which accumulate at the electrodes.

6. A method as claimed in claim 5, wherein the electron bombardment of the anode in the radiation tube also produces a pulsed stream of neutrons associated with said beam of electromagnetic radiation which stream of neutrons also enters the irradiated electrolyte and the hydrogen and the oxygen are collected as highly ionised gases in which the hydrogen comprises a higher proportion of deuterons than in naturally occurring hydrogen.

7. A method as claimed in claim 5 wherein said electron bombardment is produced by applying between the anode and a filament of said radiation tube a pulsating DC voltage of at least 17,000 volts and pulse frequency of at least 3,000 pulses per second.

8. A method as claimed in claim 5 wherein there is generated within the said vessel a magnetic field which in the vicinity of the irradiated electrolyte extends between said electrodes and which in the vicinity of the radiation tube is directed so as to accelerate the bombardment electrons.

9. A method of decomposition of water to produce hydrogen and oxygen comprising the steps of
    placing an electrically conductive aqueous solution in a vessel in contact with a pair of separated electrodes
    irradiating the aqueous solution with electromagnetic radiation of wavelength less than $10^{-10}$ meters while causing electric current to flow between said electrodes and collecting hydrogen and oxygen gases which accumulate therefrom.

10. A method as claimed in claim 9, wherein a pulsed stream of neutrons is associated with said electromagnetic radiation and wherein the hydrogen and oxygen gases are collected as a highly ionized gaseous mixture in which the hydrogen contains a higher proportion of deuterons than naturally occurring hydrogen.

11. A method as claimed in claim 10, wherein a magnetic field is applied to said aqueous solution in field directions extending between said electrodes.

12. A method as claimed in claim 11, wherein the magnetic field produces a "spin flip" effect on portons released within the aqueous solution.

13. A method as claimed in claim 12, wherein said magnetic field is generated by permanent magnets.

14. A method as claimed in claim 9, wherein said electrodes are cylindrically arranged about a common centre line and wherein the electromagnetic radiation is generated in a radiation generator disposed within the inner electrode and radiates outwardly through the inner electrode into said aqueous solution.

* * * * *

UNITED STATES PATENT AND TRADEMARK OFFICE
CERTIFICATE OF CORRECTION

Page 1 of 2

PATENT NO. : 4,107,008
DATED : August 15, 1978
INVENTOR(S) : Stephen Horvath

It is certified that error appears in the above-identified patent and that said Letters Patent are hereby corrected as shown below:

Column 1, line 44, "it" should be --It--.

Column 3, line 67, "7" should be --17--.

Column 4, line 47, "10,00" should be --10,000--.

Column 6, line 45, "200" should be --220--.

Column 7, line 27, "82.83." should be --82,83.--.

Column 9, line 22, "79" should be --78--.

Column 10, line 21, "61" should be --161--.

Column 12, line 21, "this" should be --This--.

Column 12, line 35, "at" should be --as--.

Column 22, line 4, "2 2/3" should be --2 1/2--.

UNITED STATES PATENT AND TRADEMARK OFFICE
CERTIFICATE OF CORRECTION

PATENT NO. : 4,107,008
DATED : August 15, 1978
INVENTOR(S) : Stephen Horvath

It is certified that error appears in the above—identified patent and that said Letters Patent are hereby corrected as shown below:

In the table spanning Columns 25 & 26, the height dimension for "Modular Stuart Cell" is missing. A height of --49"-- should be inserted.

Column 28, line 51, "portons" should be --protons--.

Signed and Sealed this

Tenth Day of April 1979

[SEAL]

Attest:

RUTH C. MASON
Attesting Officer

DONALD W. BANNER
Commissioner of Patents and Trademarks